United States Patent
Tokizono et al.

(10) Patent No.: US 7,079,337 B2
(45) Date of Patent: Jul. 18, 2006

(54) BI STAPLE FLYING HEIGHT DETECTION BY BEMF CONTROL PROFILE AND DATA INTEGRITY PROBLEM PROTECTION

(75) Inventors: Akira Tokizono, Kanagawa (JP); Chikako Sasaki, Kanagawa (JP); Kenji Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 24 days.

(21) Appl. No.: 10/944,356

(22) Filed: Sep. 17, 2004

(65) Prior Publication Data

US 2005/0094299 A1    May 5, 2005

(30) Foreign Application Priority Data

Nov. 4, 2003    (JP)    .............. 2003-374515

(51) Int. Cl.
   *G11B 27/36*    (2006.01)
(52) U.S. Cl. .............. 360/31; 360/60; 360/75; 360/53
(58) Field of Classification Search .......... 360/31, 360/75, 60, 53
   See application file for complete search history.

(56) References Cited

U.S. PATENT DOCUMENTS

| 6,094,318 A * | 7/2000 | Kim .............. 360/60 |
| 6,618,215 B1 * | 9/2003 | Fung et al. .............. 360/31 |
| 2001/0013985 A1 * | 8/2001 | Baba et al. .............. 360/60 |
| 2004/0136105 A1 * | 7/2004 | Ma et al. .............. 360/31 |
| 2005/0185312 A1 * | 8/2005 | Ueda et al. .............. 360/31 |

FOREIGN PATENT DOCUMENTS

| JP | 07045022 A | * | 2/1995 |
| JP | 2000-132933 | | 5/2000 |
| JP | 2001-229637 | | 8/2001 |
| JP | 2002-100139 | | 4/2002 |

* cited by examiner

*Primary Examiner*—David Hudspeth
*Assistant Examiner*—Dan I Davidson
(74) *Attorney, Agent, or Firm*—Townsend and Townsend and Crew LLP

(57) ABSTRACT

Embodiments of the present invention relate to detecting a flying high state in which a head/slider is flying stably at a high flying position, and then to restore the head/slider to a normal flying position. The detection is made by detecting a read output of a head using a head output detector, and by detecting a gain of a VGA using a gain detector. A control unit uses a value measured in a normal flying state as a reference value to compare a detected value with the reference value. If the compared values differ from each other, the control unit judges that a flying high state has occurred. The control unit, therefore, moves the head/slider to the vicinity of the innermost circumferential track of the disk, or unloads the head/slider.

20 Claims, 7 Drawing Sheets

(B)

(C)

BI STAPLE FLYING HEIGHT DETECTION BY BEMF CONTROL PROFILE AND DATA INTEGRITY PROBLEM PROTECTION

BACKGROUND OF THE INVENTION

The present invention relates to rotating disk storage devices such as a magnetic disk drive and a magneto-optical disk unit, and more particularly to a rotating disk storage device having a function of restoring a slider to a normal flying position if the slider is flying stably at a position higher than a normal position above a disk.

In a magnetic disk drive, a head/slider moves on a surface of a rotating magnetic disk while flying with the extremely slight height being kept from the surface. The head/slider is positioned at a given track where data is read or written. The head/slider floating off the surface of the magnetic disk is supported by a spring structure, which is called a flexure, from a load beam constituting a head suspension assembly (hereinafter referred to as HSA). The head/slider keeps a given flying height by pivotally moving about a dimple formed in a flexure tongue.

The pivoting motion is in general known as the pitch and roll motion or the gimbal motion. Fluctuations in buoyant force applied to an air bearing surface (hereinafter referred to as ABS) of the slider, and irregularity of the behavior of the HSA, and so on, continuously cause fluctuations in tracking position even after the head/slider is aligned to a track. The pivoting motion, however, gives the slight pitching motion and the slight rolling motion to the slider so as to compensate for the fluctuations in tracking position.

Here, the rolling motion is motion in which the slider positioned in such a manner that the angle between the ABS and the disk surface becomes constant pivotally moves about an X axis which is assumed to be provided in the longitudinal direction of the slider. The pitching motion is motion in which the slider pivotally moves about a Y axis which is assumed to be provided in the lateral direction of the slider. In addition, the pressing load with which a load beam presses the head/slider onto the surface of the magnetic disk also influences the flying height of the slider. The characteristics of the pivoting motion depend on pitch-stiffness, roll-stiffness and pressing load. Each component of the HSA has specified tolerances so that these parameters are kept within given ranges.

In a magnetic disk drive with a ramp, which uses the load/unload method, when a head starts reading or writing, the head/slider which is being retracted into the ramp is moved to fly above a surface of a magnetic disk. This movement is called loading. The ramp is provided in an area that is outside and close to the circumference of the magnetic disk. At the time of loading, the head/slider is first positioned in the vicinity of the outermost circumferential track of the magnetic disk.

Next, when the head/slider is loaded, the head/slider moves to a tip of a sloping surface of the ramp from the home position. As a result, from the point of time at which the head/slider does not completely flies above the surface of the magnetic disk, airflow on the surface of the magnetic disk begins to influence the head/slider, which may cause the head/slider to oscillate. Accordingly, the posture or behavior of the head/slider becomes unstable at the moment of getting away from the tip of the ramp to completely fly above the surface of the magnetic disk, which may result in an abnormal condition of the flying height. If the above-mentioned tolerances of the HSA's components are severely specified, the posture or behavior of the head/slider rarely becomes unstable. However, if the tolerances are specified more severely than necessary, a problem arises in which production yields will decrease.

Japanese Patent Laid-Open No. 2001-229637 discloses the technology for detecting an abnormal condition of the momentary flying height during track following. When write operation is started, then on the basis of the top (hereinafter referred to as preamble) of servo data read by an automatic gain controller (hereinafter referred to as AGC), a gain of the servo signal is determined to amplify a read signal of the following servo data. Next, the gain of the AGC stored in a register of a channel controller is compared with its reference value to detect an abnormal condition of the flying height of a magnetic head.

Japanese Patent Laid-Open No. 2002-100139 discloses the technology in which immediately after the head/slider is loaded above the magnetic disk from the ramp, the back EMF or BEMF (Back Electromotive Force) control is performed until it is judged that the head/slider enters in a state in which servo data can be read stably and performing the seek control does not produce any problem. In the disclosed back EMF control, immediately after loading the head/slider from the ramp, a servo channel is opened to read servo data. However, the servo channel is not used for the seek control of the HSA. Instead, an output of a back EMF monitor is used to control the operation of the HSA. There is disclosed the technology in which at the point of time at which it is judged that the servo data could be properly read, a head is positioned in an area other than an effective recording area, which corresponds to the circumferential area of a magnetic disk. Then the track following is performed, for example, for a period of 40 msec to blow off contaminations adhered to the head by the wind pressure produced by the disk rotation. Moreover, the reference also discloses the technology in which on the basis of the knowledge that flying of the head is not stable for a fixed period of time after the head is loaded from the ramp, verification is executed for write operation performed for the fixed period of time immediately after the head is loaded.

Japanese Patent Laid-Open No. 2000-132933 discloses the technology in which a state of a magnetic head is always monitored by use of an amplitude value of an output signal of the magnetic head. An amplitude value of an output signal of the magnetic head in a servo area is determined and compared with a reference amplitude value of an output signal of a normal magnetic head. If the determined amplitude value is smaller than the reference amplitude value, then it is judged that an abnormal condition has occurred. In the event of an abnormal condition, writing of data to the next data track of a servo pattern is canceled.

Since the pivoting motion of a head/slider is subtle, it is difficult to precisely keep track of its behavior. If the head/slider stably flies at a position higher than a normal position, it is detected as a phenomenon such as a seek error, a data read error, or a data write error. However, even if these error phenomena are detected, it is not easy to immediately identify an abnormal condition of the flying height of the head/slider as its cause from among various kinds of possible factors. In particular, if the flying height is at a position between the normal height and the height from which data cannot be read at all, a problem is produced. In this case, although servo data can be read by correcting it, there is a possibility that writing of data will fail. Therefore, in order to completely prevent such an error from occurring, it is necessary to verify all write operation. The verification, however, will cause the performance of the drive to decrease more than necessary.

BRIEF SUMMARY OF THE INVENTION

The inventors of the present invention discovered a phenomenon that when loading the head/slider from the ramp and moving the head/slider from the outermost circumferential track to the innermost circumferential track, a gain of a variable gain amplifier (hereinafter referred to as VGA) is high in the beginning, and the gain of the VGA suddenly decreases on the way, and subsequently this state in which the gain is low is kept while the head/slider returns from the innermost circumferential track to the outermost circumferential track. Thus, the inventors of the present invention confirmed the existence of such a state, which is called bi-stable, relating to the flying position of the head/slider.

The bi-stable state is a state in which relating to the flying position taken when the head/slider flies at a stable height from the surface of the magnetic disk, there exist two modes: a flying position at a normal height that is expected, and a flying position that is four times to eight times higher than the normal flying position (hereinafter referred to as flying high). Although there are such two stable flying positions, if the head/slider stays in the flying high position, an interval between the head and the recording surface of the magnetic disk becomes wider, causing reading of servo data and reading or writing of user data to become unstable. As a result, the following state occurs: the servo data cannot be read; or the servo data can be read, but reading or writing of user data results in an error. Here, the stable flying position does not mean a position at which the head/slider flies at a completely constant flying height. This means a position at which the head/slider flies at a height that slightly changes within a certain range due to the pitch and roll motion and variations in circumferential speed on a track where the head/slider flies.

The flying height of the head/slider is determined by airflow on the surface of the magnetic disk, a shape of the ABS, the structure of the HSA, and the interrelationship between the ABS and the airflow, and others. The flying height, therefore, cannot be controlled by directly monitoring it. Subsequent examination has revealed that firstly the flying high state is likely to occur when the head/slider is loaded on the magnetic disk from the ramp. Additionally, the flying high state could conceivably occur when certain conditions are satisfied. This conditions include: specified tolerances relating to the pitch stiffness, the roll stiffness, and the pressing load, which influence flying properties of the head/slider; the posture of the head/slider at the time of loading; and the interaction among these various conditions. The examination has also revealed that secondly the flying high state sometimes occurs due to sudden acceleration or stop during the seek control.

Embodiments of the present invention provide a rotating disk storage device that can detect a flying high state occurring in the head/slider, and that can restore it to a state of the normal flying height. Another feature of the present invention is to provide a rotating disk storage device that can detect a flying high state to prevent a write error from occurring. Still another feature of the present invention is to provide a method for restoring the head/slider being in a flying high state to a state of the normal flying height. A further feature of the present invention is to provide a method for preventing a write error when a flying high state occurs in the head/slider. Still a further feature of the present invention is to provide a method for detecting a change in steady-state flying position.

According to a first aspect of the present invention, a rotating disk storage device comprises a rotating disk recording medium on which a plurality of tracks are arranged, servo data being written to each of the plurality of tracks; a head/slider flying on a surface of the rotating disk recording medium at least at a first steady-state flying position or at a second steady-state flying position, the head/slider including a head and a slider to which the head is attached; a turnable actuator head suspension assembly being mounted with the head/slider; and a control unit which performs adaptable operation on the basis of a result of comparison between a first characteristic value representing the magnitude of a read signal of the servo data which is read at the first steady-state flying position by the head and a second characteristic value representing the magnitude of a read signal of the servo data which is read at the second steady-state flying position by the head.

The first steady-state flying position is a flying position at which the rotating disk storage device is expected to operate normally; and the second steady-state flying position is a flying position that is higher than the first steady-state flying position. In addition, the steady-state flying position does not mean a position at which the slider flies at a certain constant height. It means a position specified as a given range within which the slider flies with its height being slightly changed by the influence of projections existing on the surface of the recording medium, slight up-and-down motion of the rotating surface of the recording medium, a current position of the slider in the radial direction of the recording medium, the influence of air current on the surface of the rotating disk recording medium, or the like.

The first and second characteristic values may be each a characteristic value so long as it represents the magnitude of the read signal of the servo data. For example, the characteristic value may be a read output value of the head or a gain value of a variable gain amplifier for amplifying a read output of the head. The read output value of the head may be any value so long as the adopted value correlates with the magnitude of the read signal of the head, e.g., an amplitude value, an area value of a waveform, and a mean value of the amplitude of a plurality of waveforms. The gain value of the variable gain amplifier is a value that indirectly represents the read output of the head. Parameters of other devices may also be adopted regardless of a name of the device.

The first characteristic value is a value that is read when the head/slider is in the first steady-state flying position. The first characteristic value becomes a reference value used for the comparison with the second characteristic value, and can be provided as a static value or a dynamic value. The first characteristic value provided as a static value may also be handled in the following manner: measuring in advance the first characteristic value in the process of manufacturing a storage device before shipping the device; storing the measured value in a rotating disk recording medium or a nonvolatile memory as a reference value; and reading out the value into a main storage device such as a RAM so that this value can be compared with the second characteristic value when actually using the device. The value measured as the first characteristic value in the manufacturing process is not always continuously adopted. After the storage device is actually used, the value may also be properly updated to a characteristic value representing the magnitude of a read signal of servo data that is read in the head/slider flying at the first steady-state flying position. As a result, it becomes possible to compensate the aged deterioration that has occurred in a servo-data reading circuit. One or more values can be provided as the first characteristic value. If only one first characteristic value is provided, an arbitrary track may be selected to adopt its read value. However, it is desirable to select a plurality of tracks from the whole area of the recording medium, and to calculate a representing value of respective values read from the selected tracks so as to adopt the representing value as the first characteristic value.

If a plurality of first characteristic values are provided, a plurality of zones are first defined in the radial direction of the recording medium, and a plurality of tracks are then selected from each zone so that a representing value can be calculated for each zone. The representing value should be calculated so that the calculated value represents the magnitude of a read signal of servo data; for example, a mean value, or a median, of the values read from the plurality of tracks, or a value obtained by adding a standard deviation to the mean value, or the like, can be used. If the calculated representing value is adopted as the first characteristic value, variations in characteristic value detected from each track can be reduced, making it possible to achieve a more appropriate reference value.

The first characteristic value provided as a dynamic value may be a characteristic value read from a track in the vicinity of a current track position at the time of starting the seek control from the current track position of the head/slider to a target track position. In addition, it may also be a representing value that is calculated from characteristic values read from a plurality of tracks in the vicinity of the current track position.

The second characteristic value is a value read when the head/slider is at the first steady-state flying position or at the second steady-state flying position. This value is stored properly in the main storage device. As a result of comparing the second characteristic value with the first characteristic value, if it is judged that the head/slider is flying at the second steady-state flying position, adaptable operation is executed to cope with this; for example, positioning of the head/slider to the innermost circumferential track, write verification, unloading, and the like, are executed. As is the case with the first characteristic value, a characteristic value read from one track may be adopted as the second characteristic value. In addition, a representing value that is calculated so as to represent the magnitude of a read signal of servo data may also be adopted. The representing value is, for example, a mean value, or a median, of the values read from the plurality of tracks, or a value obtained by adding a standard deviation to the mean value, or the like. If the first characteristic value is provided as a static value and is a representing value calculated on a zone basis, a representing value calculated from a plurality of tracks in the same zone can be used as the second characteristic value. Moreover, if the first characteristic value is provided as a dynamic value, a characteristic value which is read from one track in the vicinity of a target track can be used as the second characteristic value, or a representing value which is calculated from characteristic values read from a plurality of tracks in the vicinity of the target track position can be used as the second characteristic value. The methods for obtaining a characteristic value representing the magnitude of servo data can be applied to either a read output value of the head or a gain value of a variable gain amplifier used for amplifying a read output of the head.

According to a second aspect of the present invention, a rotating disk storage device comprises a rotating disk recording medium on which a plurality of tracks are arranged, the plurality of tracks including an innermost circumferential track, a central track and an outermost circumferential track, servo data being written to each of the plurality of tracks; a head/slider flying above a surface of the rotating disk recording medium at a plurality of steady-state flying positions, the head/slider including a head and a slider to which the head is attached; a turnable actuator head suspension assembly being mounted with the head/slider; a detector for detecting a characteristic value representing the magnitude of a read signal of the servo data read by the head; and a control unit which, while controlling the actuator head suspension assembly, receives the characteristic value as a first characteristic value, the characteristic value being detected by the detector in an outgoing path along which the head/slider moves from the vicinity of the outermost circumferential track to the vicinity of the innermost circumferential track; while controlling the actuator head suspension assembly, receives the characteristic value is received as a second characteristic value, the characteristic value being detected by the detector in a return path along which the head/slider moves from the vicinity of the innermost circumferential track to the vicinity of the outermost circumferential track; and performs adaptable operation on the basis of the result of comparison between the first characteristic value and the second characteristic value.

A characteristic value representing the magnitude of a read signal of servo data may be, for example, a read output value of the head, or a gain value of a variable gain amplifier used for amplifying a read output of the head, can be adopted. The read output value of the head may be any value so long as the adopted value correlates with the magnitude of the read signal of the head. The adopted value may be, for example, an amplitude value, an area value, a mean value of the amplitude of a plurality of waveforms, or the like. The gain value of the variable gain amplifier is a value that indirectly represents the read output of the head. Parameters of other devices may also be adopted regardless of a name of the device. A characteristic value read from one arbitrary track may be adopted as each of the first and second characteristic values. In addition, a representing value that is calculated so as to represent the magnitude of a read signal of servo data may also be adopted. The representing value is, for example, a mean value, or a median, of the values read from the plurality of tracks, or a value obtained by adding a standard deviation to the mean value, or the like. If the calculated representing value is adopted as the characteristic value, it is possible to reduce variations in characteristic value detected from individual tracks. In order to determine respective representing values for the first and second characteristic values, a plurality of zones are defined in the radial direction of the recording medium, and a plurality of tracks are then selected from each zone, which enables calculation on a zone basis. The methods for obtaining a characteristic value representing the magnitude of servo data can be applied to either a read output value of the head or a gain value of a variable gain amplifier used for amplifying a read output of the head.

If the first and second characteristic values are representing values calculated from the zones, it is possible to eliminate the influence of the flying height of the head/slider caused by the difference between track positions. Accordingly, it is desirable to compare representing values of the same zone between the outgoing path and the return path. However, if the difference between the first steady-state flying position and the second steady-state flying position is large, the difference between the characteristic values, each representing the magnitude of a read signal of servo data, also becomes large. Therefore, a flying high state can be detected by comparing representing values of different zones between the outgoing path and the return path, and then some operation can be executed to cope with the flying high state.

A third aspect of the present invention relates to a method for moving a head/slider from a second steady-state flying position to a first steady-state flying position in a rotating disk storage device. A rotating disk recording medium includes a plurality of tracks to which servo data is written; the head/slider flying above a surface of the rotating disk recording medium at least at the first steady-state flying position or at the second steady-state flying position, the head/slider including a head and a slider to which the head is attached; and an actuator head suspension assembly mounted with the head/slider. The method comprises, on a basis of a characteristic value representing the magnitude of a read signal of the servo data, detecting a state in which the head/slider is flying at the second steady-state flying position; and if the state in which the head/slider is flying at the second steady-state flying position is detected, positioning the head/slider in the vicinity of the innermost circumferential track among the plurality of tracks by controlling the actuator head suspension assembly.

A fourth aspect of the present invention relates to a detection method for detecting a change in steady-state flying position in a rotating disk storage device. The rotating disk storage device includes a rotating disk recording medium on which a plurality of tracks are arranged, the plurality of tracks including an innermost circumferential track and an outermost circumferential track, servo data being written to each of the plurality of tracks; a head/slider flying above a surface of the rotating disk recording medium at a plurality of steady-state flying positions, the head/slider including a head and a slider to which the head is attached; and an actuator head suspension assembly mounted with the head/slider. The detection method comprises moving the head/slider along an outgoing path from the vicinity of the outermost circumferential track to the vicinity of the innermost circumferential track by controlling the actuator head suspension assembly; while executing the step for moving the head/slider along the outgoing path, detecting a first characteristic value representing the magnitude of a read signal of the servo data read by the head; moving the head/slider along a return path from the vicinity of the innermost circumferential track to the vicinity of the outermost circumferential track by controlling the actuator head suspension assembly; while executing the step for moving the head/slider along the return path, detecting a second characteristic value representing the magnitude of a read signal of the servo data read by the head; and comparing the first characteristic value with the second characteristic value.

A fifth aspect of the present invention relates to a method for preventing a write error from occurring in a rotating disk storage device. The rotating disk storage device includes a rotating disk recording medium in which a plurality of tracks are arranged, servo data being written to each of the plurality of tracks, the plurality of tracks including an innermost circumferential track and an outermost circumferential track; a head/slider flying above a surface of the rotating disk recording medium at a plurality of steady-state flying positions, the head/slider including a head and a slider to which the head is attached; an actuator head suspension assembly mounted with the head/slider; and a ramp that provides the head/slider with a retraction area. The detection method comprises loading the head/slider on the rotating disk recording medium from the ramp; moving the head/slider along an outgoing path from the vicinity of the outermost circumferential track to the vicinity of the innermost circumferential track by performing back EMF or BEMF control on the actuator head suspension assembly; while executing the step for moving the head/slider along the outgoing path, detecting a first characteristic value representing the magnitude of a read signal of the servo data read by the head; moving the head/slider along a return path from the vicinity of the innermost circumferential track to the vicinity of the outermost circumferential track by performing the back EMF control on the actuator head suspension assembly; while executing the step for moving the head/slider along the return path, detecting a second characteristic value representing the magnitude of a read signal of the servo data read by the head; comparing the first characteristic value with the second characteristic value; and on the basis of the result of the comparison step, executing write verification for write operation at least once.

According a sixth aspect of the present invention, a rotating disk storage device comprises a rotating disk recording medium in which a plurality of tracks are arranged, servo data being written to the plurality of tracks, the plurality of tracks including an innermost circumferential track and an outermost circumferential track; a head/slider flying on a surface of the rotating disk recording medium at a plurality of steady-state flying positions, the head/slider including a head and a slider to which the head is attached; a turnable actuator head suspension assembly, the actuator head suspension assembly being provided with the head/slider; and a control unit which perform adaptable operation on the basis of a result of comparison between a first characteristic value representing the magnitude of a read signal of the servo data read by the head at any one of the plurality of steady-state flying positions on one or more tracks and a second characteristic value representing the magnitude of a read signal of the servo data read by the head at the steady-state flying position, which differs from the any one of the steady-state flying position, on one or more tracks that differ from said one or more tracks.

If there arises a change in flying position of the head/slider between different track positions, the control unit compares the characteristic values each representing the magnitude of a read signal of the servo data to detect this, and then executes adaptable operation. The adaptable operation includes the following: positioning the head/slider in the vicinity of the innermost circumferential track among the plurality of tracks; unloading the head/slider into the ramp if the storage device uses the load/unload method; and executing the write verification for write operation.

According to a seventh aspect of the present invention, a rotating disk storage device comprises a rotating disk recording medium in which a plurality of tracks are arranged, servo data being written to each of the plurality of tracks, the plurality of tracks including an innermost circumferential track; a head/slider flying above a surface of the rotating disk recording medium at a first steady-state flying position or at a second steady-state flying position, the head/slider including a head and a slider to which the head is attached; a turnable actuator head suspension assembly mounted with the head/slider; a servo channel for detecting a read signal of the servo data read by the head; and a control unit that moves the head/slider to the vicinity of the innermost circumferential track if the read signal cannot be received from the servo channel, or if the read signal received cannot be read.

According to an eighth aspect of the present invention, a rotating disk storage device comprises a rotating disk recording medium in which a plurality of tracks are arranged, servo data is written to each of the plurality of tracks, the plurality of tracks including an innermost circumferential track; a head/slider flying above a surface of the rotating disk recording medium at a first steady-state flying position or at a second steady-state flying position, the head/slider including a head and a slider to which the head is attached; an actuator head suspension assembly mounted with the head/slider; a ramp that provides the head/slider with a retraction area; and a control unit which executes write verification for first write operation after loading the head/slider on the rotating disk recording medium from the ramp, and controls the actuator head suspension assembly to position the head/slider in the vicinity of the innermost circumferential track if a write error is detected.

According to the present invention, there can be provided the above-mentioned rotating disk storage device that can detect a flying high state occurring in the head/slider, and that can restore it to a state of the normal flying height. In addition, according to the present invention, there can be provided the rotating disk storage device that can detect a flying high state to prevent a write error from occurring. Moreover, according to the present invention, there can be provided the method for restoring the head/slider being in a flying high state to a state of the normal flying height. Further, according to the present invention, there can be provided the method for preventing a write error when a flying high state occurs in the head/slider. Furthermore, according to the present invention, there can be provide the method for detecting a change in steady-state flying position.

DETAILED DESCRIPTION OF THE INVENTION

Explanation of Magnetic Disk Drive

Figure 1:
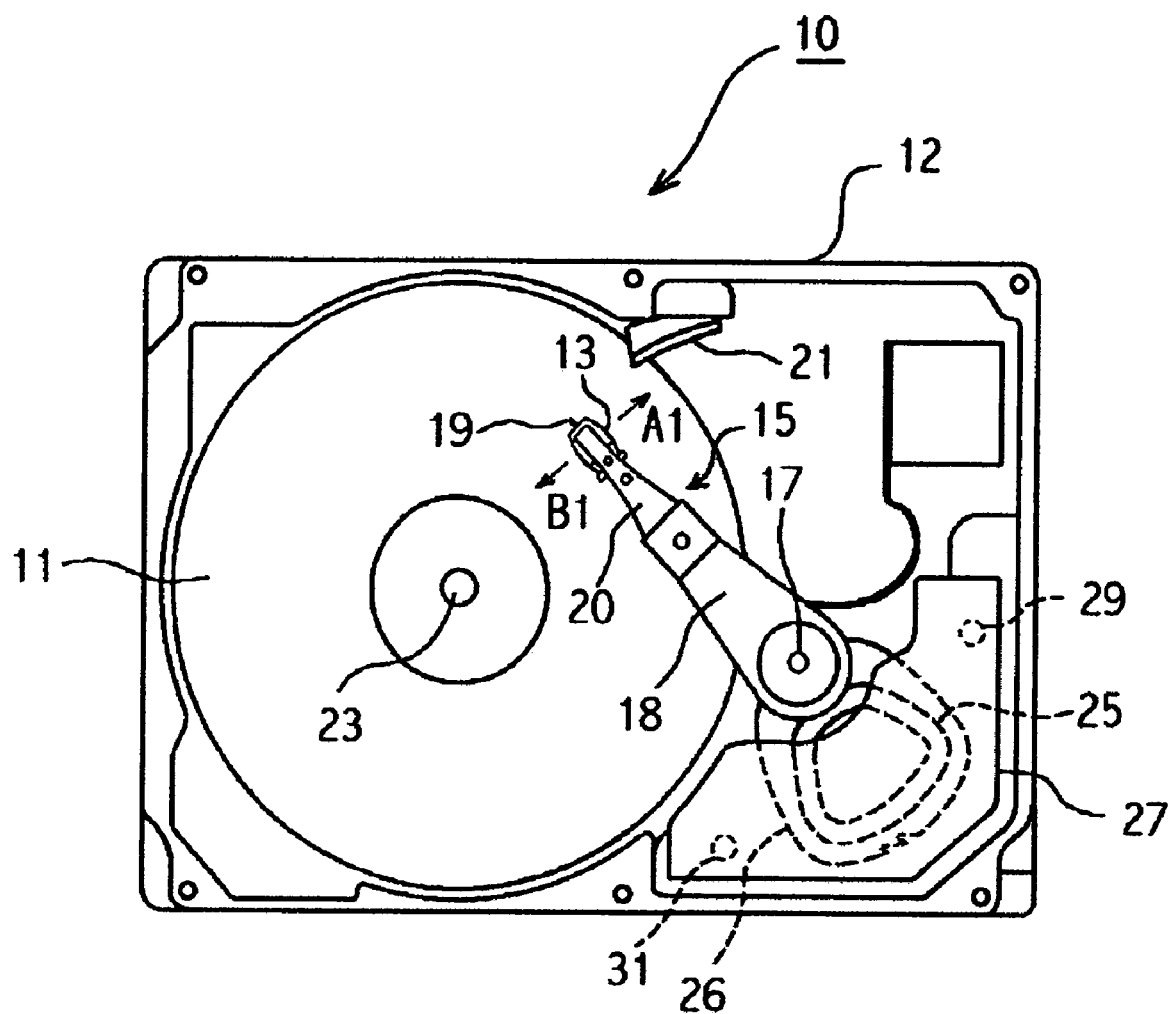
FIG. 1 is a plan view illustrating an example of a magnetic disk drive according to one embodiment of the present invention.
Figure 2:
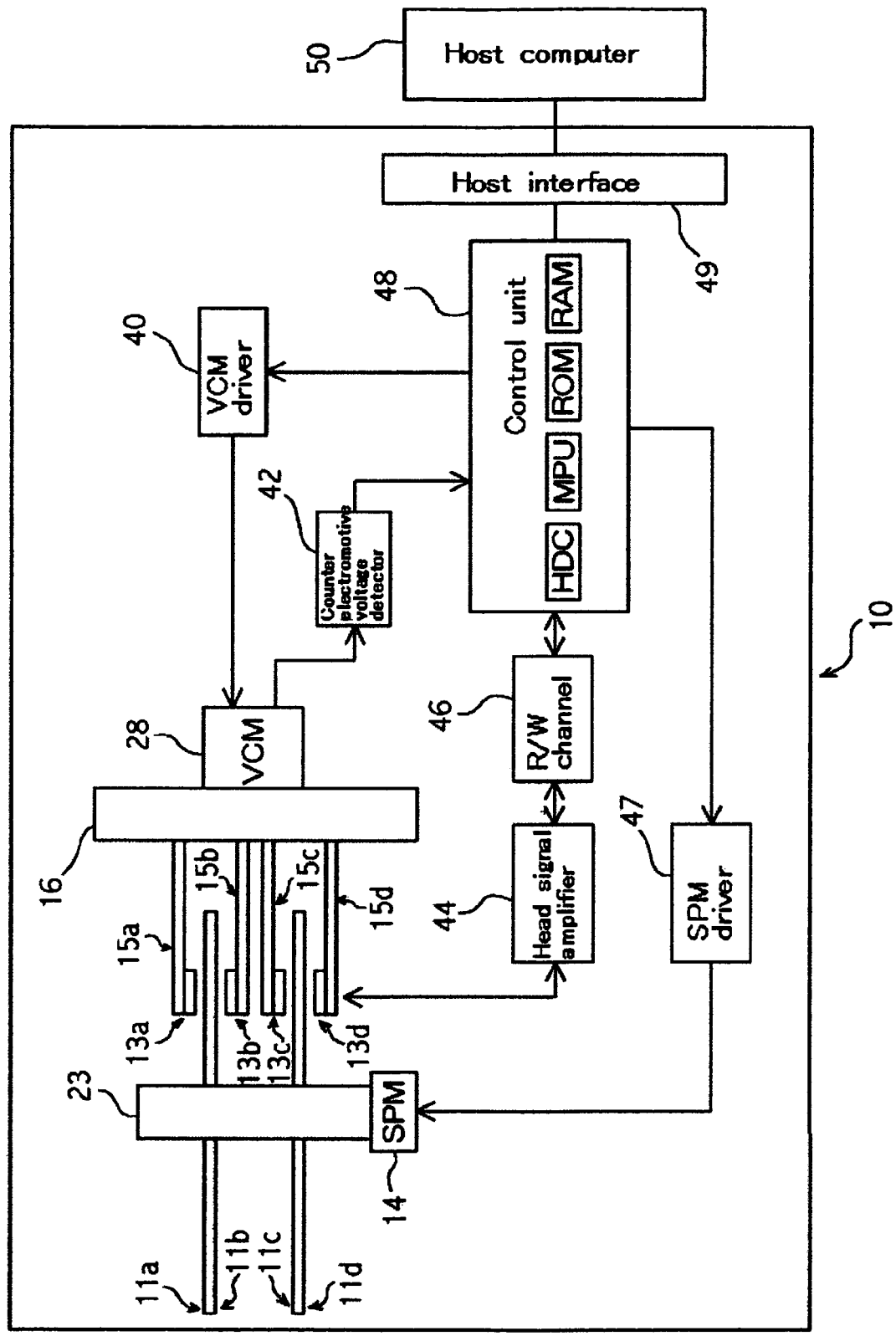
FIG. 2 is a schematic block diagram illustrating the magnetic disk drive shown in FIG. 1.
Figure 4:
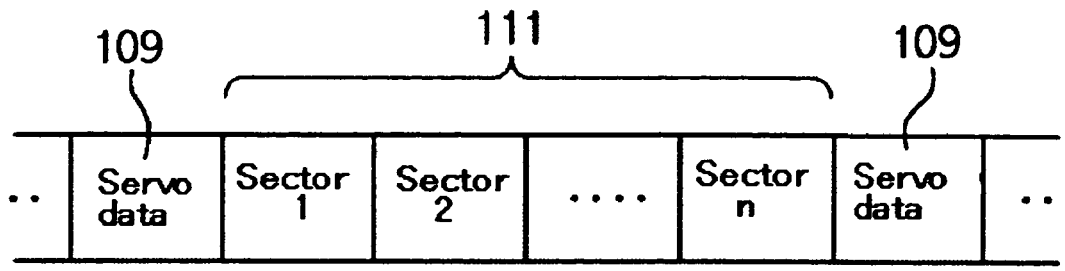
FIGS. 4A, 4B, 4C are diagrams illustrating in detail the format of the magnetic disk shown in FIG. 3.
Figure 4:
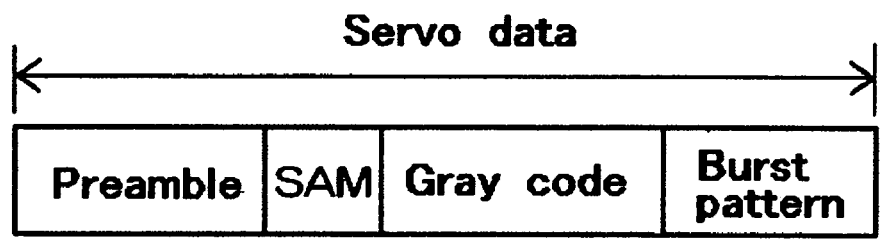
Figure 4:
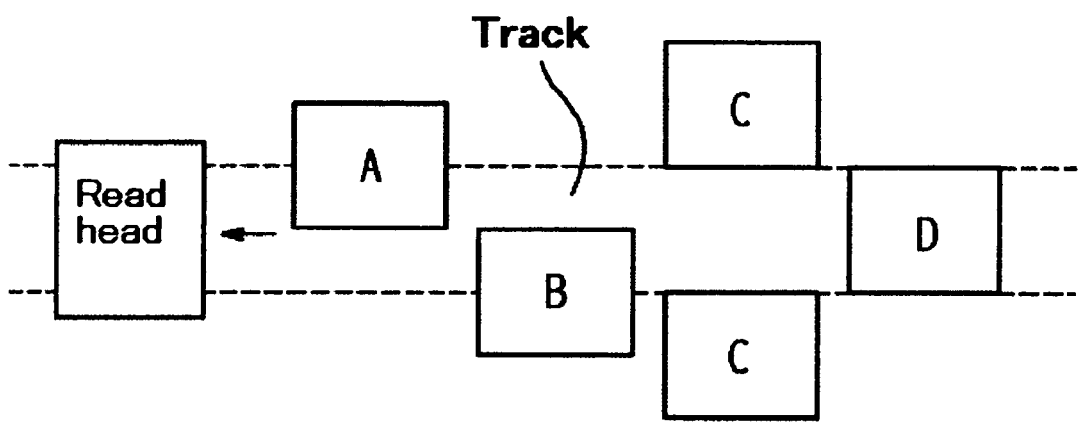
Figure 5:
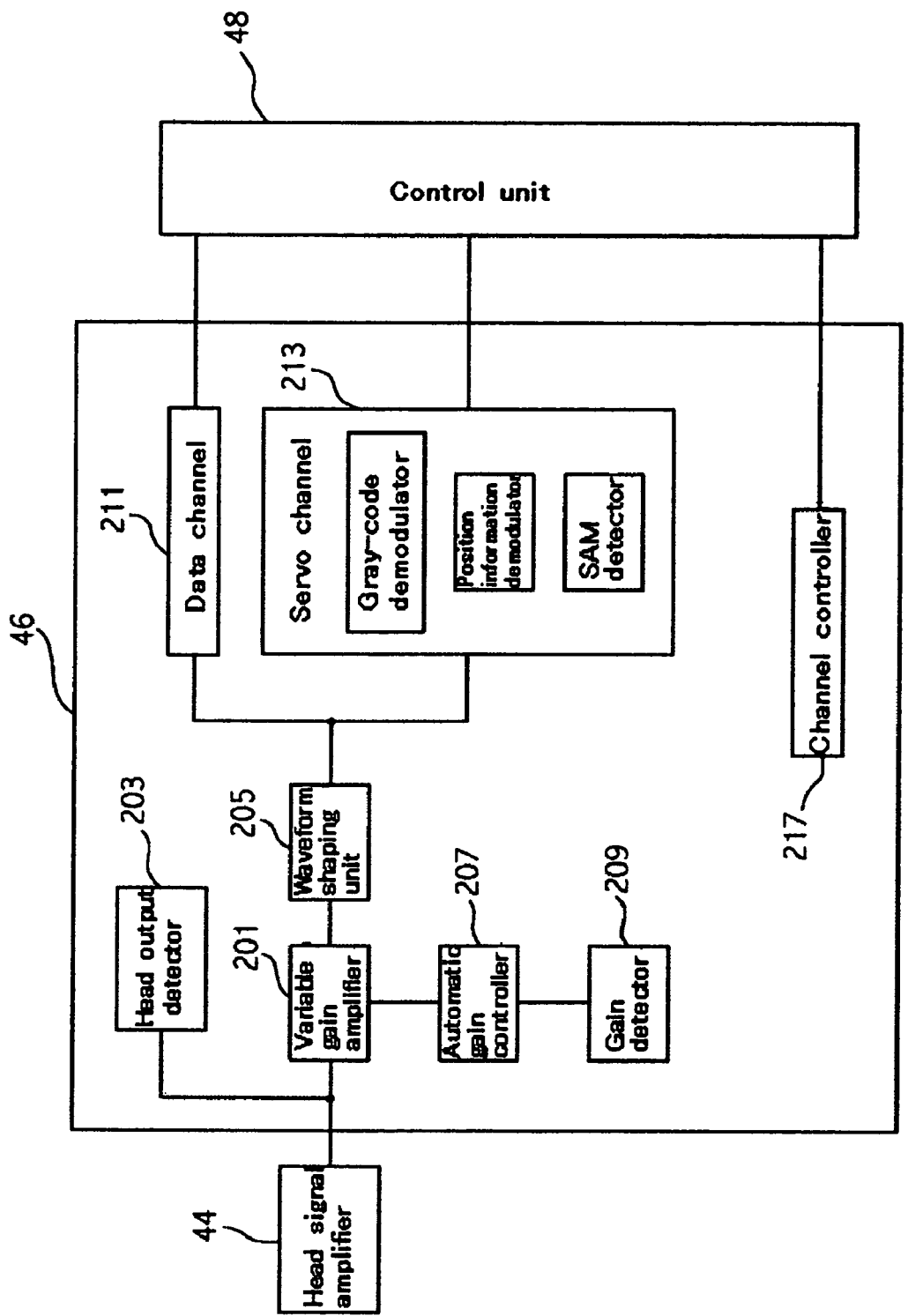
FIG. 5 is a block diagram illustrating an example of a R/W channel shown in FIG. 1.

A magnetic disk drive according to an embodiment of the present invention will be described with reference to FIGS. 1 and 2. FIG. 1 is a schematic plan view of a magnetic disk drive 10. FIG. 2 is a schematic block diagram illustrating the magnetic disk drive 10. The magnetic disk drive 10 comprises various kinds of components, which are housed in an enclosure 12. A disc-shaped magnetic disk 11 has recording surfaces on both sides, each of which is covered with a magnetic layer formed on its surface. The magnetic disk 11 is attached to a hub that forms a spindle motor 14 (hereinafter referred to as SPM) provided on the lower part. The magnetic disk 11 rotates about a rotation axis 23 of the SPM. Formats of the recording surfaces of the magnetic disk 11 will be described later with reference to FIGS. 3 through 5.

The magnetic disk drive 10 shown in FIG. 1 comprises a ramp 21 provided at a position close to and outside an outer circumferential area of the magnetic disk 11. The load/unload method is adopted as a retraction method. A scope of the present invention, however, also includes everything that can be applied to the magnetic disk drive 10 of the contact start-stop (hereinafter referred to as CSS) method. The magnetic disk drive 10 adopting the CSS method has retraction surfaces on part of the magnetic disk 11 as well as recording surfaces so as to provide a retraction area for a slider. Although the number of the magnetic disks 11 according to this embodiment is two, it can also be one, or more than two.

An actuator head suspension assembly 15 (hereinafter referred to as AHSA) comprises a HSA 20, an actuator arm 18, a coil support 26, and a voice coil 25 supported by the coil support 26. The AHSA 15 is mounted to a base of the enclosure 12 by a pivot cartridge so that the AHSA 15 can move pivotally about a pivot shaft 17 in directions of A1 and B1. The actuator arm 18, the coil support 26, and a mounting portion of the pivot cartridge are molded as one body by aluminum die-casting or synthetic resin. However, what is called, the well-known lamination layer suspension structure may also be adopted; more specifically, the HSA 20, or a component that is called a head gimbal assembly, is directly mounted to the pivot cartridge.

The HSA 20 comprises a load beam attached to the actuator arm 18, and a flexure attached to the load beam. A merge lip 19 or a tab is provided at the tip of the load beam. A head/slider 13 is attached to the flexure. The head/slider 13 comprises a head and a slider to which the head is attached. The head includes a read head for reading data and a write head for writing data. However, a head used as both a write head and a read head can also be adopted. Moreover, the present invention can also be applied to a magnetic disk drive specifically designed for writing which has only a write head, or a magnetic disk drive specifically designed for reading which has only a read head. The slider is formed with an ABS to which buoyant force produced by air current occurring on the surface of the rotating magnetic disk 11 is applied. As a result of working of the ABS, the slider flies above a recording surface with a slight gap being kept. The head/slider 13 is mounted to the flexure in a manner that the ABS confronts the recording surface of the magnetic disk 11. The load beam creates pressure (pressing load) in such a direction that the pressure presses the head/slider 13 onto the recording surface of the magnetic disk 11.

The coil support 26 for supporting the voice coil 25 is provided at the back end of the AHSA 15. In addition, an upper yoke 27 is supported by the base of the enclosure 12 and disposed so as to cover the coil support 26 from above. A lower yoke (not illustrated) is provided adjacent to the base of the enclosure 12 so as to face the yoke 27, and consequently they form a pair of yokes. A voice coil magnet (not illustrated) is mounted to the lower yoke so that a yoke gap is formed between the voice coil magnet and the upper yoke. The voice coil magnet can be mounted to either the upper yoke or the lower yoke, or to both of the yokes.

The pair of yokes and the voice coil magnet constitute a voice coil magnetic circuit. The voice coil magnetic circuit and the voice coil 25 constitute a voice coil motor (hereinafter referred to as VCM). The voice coil 25 is disposed in a magnetic field of the yoke gap that is formed by the yokes and the voice coil magnet. By applying an electric current to the voice coil 25 to control the direction and amount of the electric current, the AHSA 15 is allowed to move pivotally in an A1 direction or in a B1 direction at controlled speed and acceleration.

An outer crash stop 31 and an inner crash stop 29, each of which is formed including an elastic body such as rubber, are mounted to the lower part of the yoke 27 in such a manner as to erect from the base of the enclosure 12. The outer crash stop 31 and the inner crash stop 29 function as limiting members for limiting the maximum pivoting range of the AHSA 15. The outer crash stop 31 limits movement in a direction (A1 direction) in which the head/slider 13 pivots to the outside of the magnetic disk 11. On the other hand, the inner crash stop 29 limits movement in a direction (B1 direction) in which the head/slider 13 pivots toward the rotation shaft 23 of the SPM.

The ramp 21 is formed by combining a sloping surface and a flat surface. A merge lip 19 slides on each surface of the ramp 21, allowing the head/slider 13 to retract. When pivotally moving the AHSA 15 in the A1 direction from the recording surface of the magnetic disk 11 to unload the AHSA 15, the merge lip 19 touches a tip of the ramp 21, which causes the head/slider 13 flying on the surface of the disk to be slightly lifted. As a result of pivotally moving the AHSA 15 furthermore, the merge lip 19 reaches a flat surface that serves as a home position where the AHSA 15 stops. If the AHSA 15 is pivotally moved in the B1 direction with the object of loading the AHSA 15 that stops in the home position, the AHSA 15 reaches a tip of the sloping surface of the ramp 21 where the air current occurring on the surface of the magnetic disk 11 begins to influence the AHSA15. This causes the head/slider 13 to start oscillating in a state in which the merge lip is kept on the sloping surface of the ramp 21.

Figure 6:
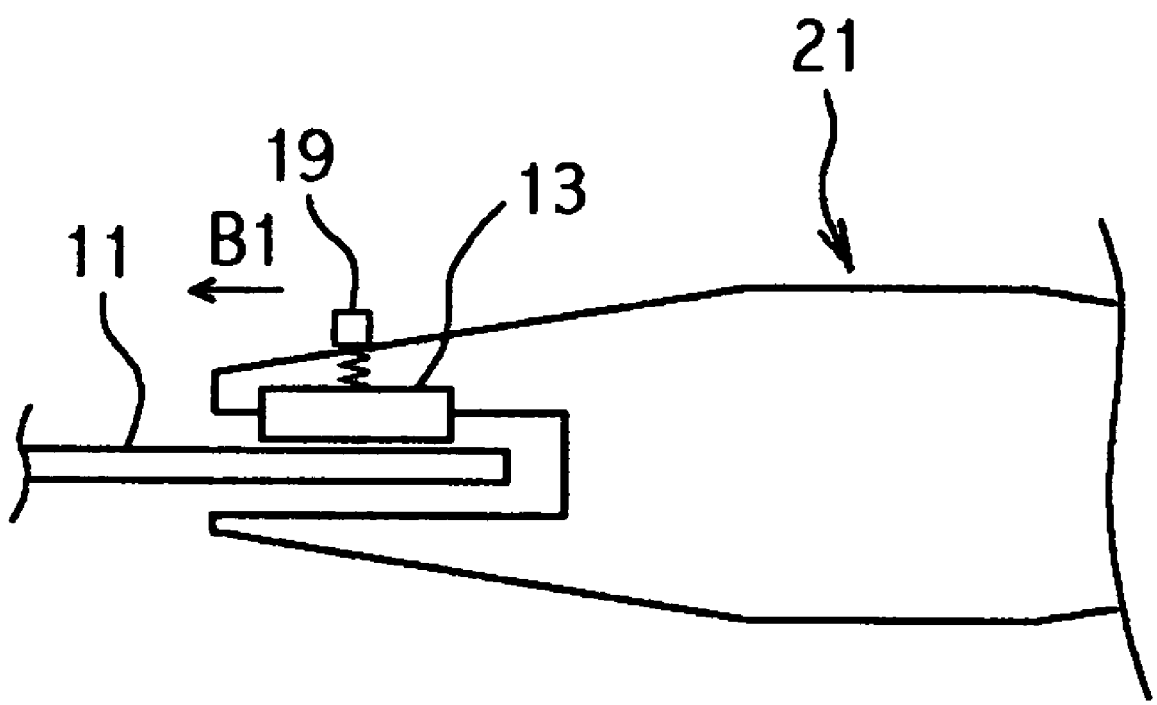
FIG. 6 is a diagram illustrating a state of a head/slider when loading it from a ramp.

This state is shown in FIG. 6. FIG. 6 is a diagram schematically illustrating a state of the head/slider 13 when it is loaded from the ramp 21. A flexure which works as a spring for the head/slider 13 is expressed as a spring that couples the merge lip 19 of the HSA 20 to the head/slider 13. In the state shown in FIG. 6, the head/slider 13 does not completely fly above the surface of the magnetic disk 11 by the buoyant force applied to the ABS, and therefore the head/slider 13 is supported by the merge lip 19 through the spring (flexure) from the sloping surface of the ramp. Accordingly, the head/slider 13 is considered to be irregularly oscillating. Then, when pivotally moving the AHSA 15 further in the B1 direction, the head/slider 13 is put in a certain posture. At this moment, the merge lip 19 moves away from the sloping surface of the ramp 21, and flies above the surface of the magnetic disk 11.

Because of the posture of the head/slider 13 at the moment when the head/slider 13 is loaded, tolerances of components constituting the HSA 20, and the like, the buoyant force from the magnetic disk 11, which is applied to the head/slider 13, may exceed the pressing load of the load beam. In such a case, the head/slider 13 becomes stable at a flying position higher than usual. This is a flying high state, which is one of the flying states of the bi-stable state in the present invention.

Explanation of a Block Diagram of the Magnetic Disk Drive

FIG. 2 is a schematic block diagram illustrating the magnetic disk drive 10. In FIG. 2, two magnetic disks are placed one upon the other in a manner that they can rotate about the rotation shaft 23 of the SPM. In addition, there are placed AHSAs 15*a* through 15*d* one upon another to which the head/sliders 13*a* through 13*d* corresponding to four recording surfaces 11*a* through 11*d* are attached respectively. The AHSAs 15*a* through 15*d* are united by a block 16 where a VCM 28 is formed. The AHSAs 15*a* through 15*d* pivotally move as one united body on the respective surfaces of the magnetic disk 11.

A counter electromotive voltage detector 42 measures a counter electromotive voltage produced while the voice coil 25 moves through the magnetic field of the voice coil magnetic circuit. Then, the counter electromotive voltage detector 42 converts the measured value into a digital value before transmitting the value to the control unit 48. It is known that the counter electromotive voltage is proportional to the pivoting speed of the AHSA 15. Monitoring the counter electromotive voltage, therefore, makes it possible to know the speed of the AHSA 15, and thereby to control pivoting operation. As far as the magnetic disk drive that adopts the load/unload method is concerned, flying properties are in general unstable immediately after the head/slider 13 is loaded on the magnetic disk from the ramp 21. Therefore, if seek control is performed immediately after the load—more specifically, servo data is immediately read to position the head/slider 13 at a given track, there is an increased possibility that a reading error of the servo data will cause the AHSA 15 to run away out of control. For this reason, instead of performing the seek control immediately after the load, the control unit 48 performs back EMF or BEMF control. To be more specific, the control unit 48 performs control by use of an output of the counter electromotive voltage detector 42 until the flying properties of the head/slider 13 become stable, allowing servo data to be reliably read. In this embodiment of the present invention, a flying high state is detected by the back EMF control performed on a load basis, and required measures are then taken. Its details will be described later.

A VCM driver 40 comprises an AD converter that converts digital manipulated variables of the VCM 28, which receives an instruction from the control unit 48, into analog manipulated variables. The VCM driver 40 generates a driving electric current for driving the VCM 28, and supplies the driving electric current to the voice coil 25. An SPM driver 47 comprises an AD converter that converts digital manipulated variables of the SPM 14, which receives an instruction from the control unit 48, into analog manipulated variables. The SPM driver 47 generates a driving electric current for controlling the SPM 14 so that its number of revolutions is kept constant.

A head signal amplifier 44 is connected to each head of the head/sliders 13*a* through 13*d*. The head signal amplifier 44 amplifies, with a controllable gain, a feeble, analog read signal read by the head, and then transmits the amplified signal to a read/write channel 46 (hereinafter referred to as R/W channel). From among the heads into which read signals are inputted, the head signal amplifier 44 selects a target head for reading according to an instruction of the control unit 48, and then amplifies a read signal from the selected head. Incidentally, the control unit 48 may also set only a target head for reading active beforehand so that the head selection by the head signal amplifier 44 can be omitted.

In addition, the head signal amplifier 44 amplifies an analog write signal which has been inputted from the R/W channel 46 at the time of writing, and then outputs the amplified signal to a head selected according to an instruction from the control unit 48. By mounting the head signal amplifier 44 to the AHSA 15, it is possible to shorten a wiring distance between the head signal amplifier 44 and a head through which a feeble signal flows, and thereby to reduce the influence of noise on a feeble signal read by the head. This is particularly called arm electronics (AE) or chip on suspension (COS).

The control unit 48 comprises a hard disk controller (hereinafter referred to as HDC), a microprocessor unit (hereinafter referred to as MPU), a volatile storage device (hereinafter referred to as RAM), and a nonvolatile storage device (hereinafter referred to as ROM). The HDC is a programmable controller, and performs the following by firmware: seek control performed by use of a read signal of servo data obtained from the R/W channel 46; back EMF control performed by use of the output of the counter electromotive voltage detector 42; rotation control of the SPM 14; an instruction to the R/W channel 46; and the like. At the timing of intermittent receipt of a servo interrupt signal from the R/W channel 46, the HDC reads servo data and determines new manipulated variables for the AHSA 15 to perform the seek control and track-following control. This state is called a servo-lock state. In addition, in order to read servo data discretely located, the HDC transmits to the R/W channel 46 a channel timing signal that is a periodical timing signal.

Upon receipt of a write or read instruction from the MPU, the HDC performs the seek control so that the head/slider 13 moves to a target track on which an instructed sector is written. After the head/slider 13 reaches the target track, the HDC performs the track-following control for adjusting a position so that the head/slider 13 follows the track. Consequently, the head can write to, or read from, the instructed track.

During the seek control, the HDC calculates the current speed of the head/slider 13 from position information on a current track, which has read from the gray code and burst pattern of the servo data. Further, the HDC calculates a distance to a target track, and thereby calculates the target speed. Moreover, the HDC transmits to the VCM driver 40 a difference between the current speed and the target speed as a manipulated variable so that the head/slider 13 is moved to the target track. The seek control adopts various kinds of control modes. For example, upon specifying a target track, the HDC first performs such control that the head/slider 13 is accelerated toward the target track, and next, such control that moving speed of the head/slider 13 is kept constant. Lastly, when the head/slider 13 reaches the vicinity of the target track, the HDC performs settling control so that the moving speed of the head/slider 13 is reduced.

In the track-following control, after the head/slider 13 reaches a target track, the HDC calculates displacement of a current track position of the head/slider 13 relative to a center of the target track from, for example, a peak hold value of a read signal including four burst patterns ABCD, which is a part of servo data. From this displacement, the HDC calculate the moving direction and acceleration of the head/slider 13 to determine a manipulated variable. Then, the HDC transmits the manipulated variable to the VCM driver 40 so that the head/slider 13 is positioned at the center of the target track. On completion of the positioning of the head/slider 13, if it is judged that the displacement of the current track position from the center of the target track is within a given range, the HDC generates a track-following completion signal, and transmits this signal to the MPU. As a result, the MPU is allowed to execute read operation or write operation. If the track following cannot be completed within a given period of time, the HDC judges that a seek error occurs. In this case, the HDC executes some error recovery procedures (hereinafter referred to as ERP)—for example, temporarily retracting the head/slider 13 into the ramp 21, and so on. Control modes of the HDC are not limited to the above-mentioned control modes. The HDC can be devised to include a plurality of well-known control modes such as the PID control mode and the feedforward control mode so that the HDC can select and use a proper control mode.

By executing programs stored in the ROM, the MPU executes command processing of a command from a host computer 50, input/output control of data, write or read control for the R/W channel 46, and the like. Upon receiving from the host computer 50 an identification number of a head to be controlled, an identification number of a target track, and an identification number of a target sector, the MPU gives an instruction to the HDC according to a command inputted from the host computer 50. Moreover, the MPU detects a flying high state occurring in the head/slider 13, and controls components of the magnetic disk drive 10 to restore it to a state of a normal flying height, and to prevent a write error from occurring.

According to an instruction from the host computer 50, a host interface 49 controls command receive operation, and data transfer operation of transferring data to the host computer 50. The ROM stores the following: various kinds of programs executed by the MPU of the control unit 48; programs required for embodying the present invention; a read output value of the head, and a gain value of the variable gain amplifier, which are reference values; and the like. The programs and the reference values may also be stored in a system data area of the magnetic disk 11. The RAM is used as a main storage device for temporarily storing a program executed by the MPU and its processing data. In addition, the RAM is also used as a buffer for temporarily storing write data transferred from the host computer 50, and read data that is read out from the magnetic disk 11 and is then transferred to the host computer 50.

Up to this point, the block diagram of the magnetic disk drive 10 according to the embodiment of the present invention was described. The name and functions of each block and its interrelationship with others, which were described with reference to the diagram, are merely examples. Therefore, they may also be divided or integrated into any kind of unit as a function or a semiconductor device within the principles of the present invention.

Explanation of a Format of the Magnetic Disk

Figure 3:
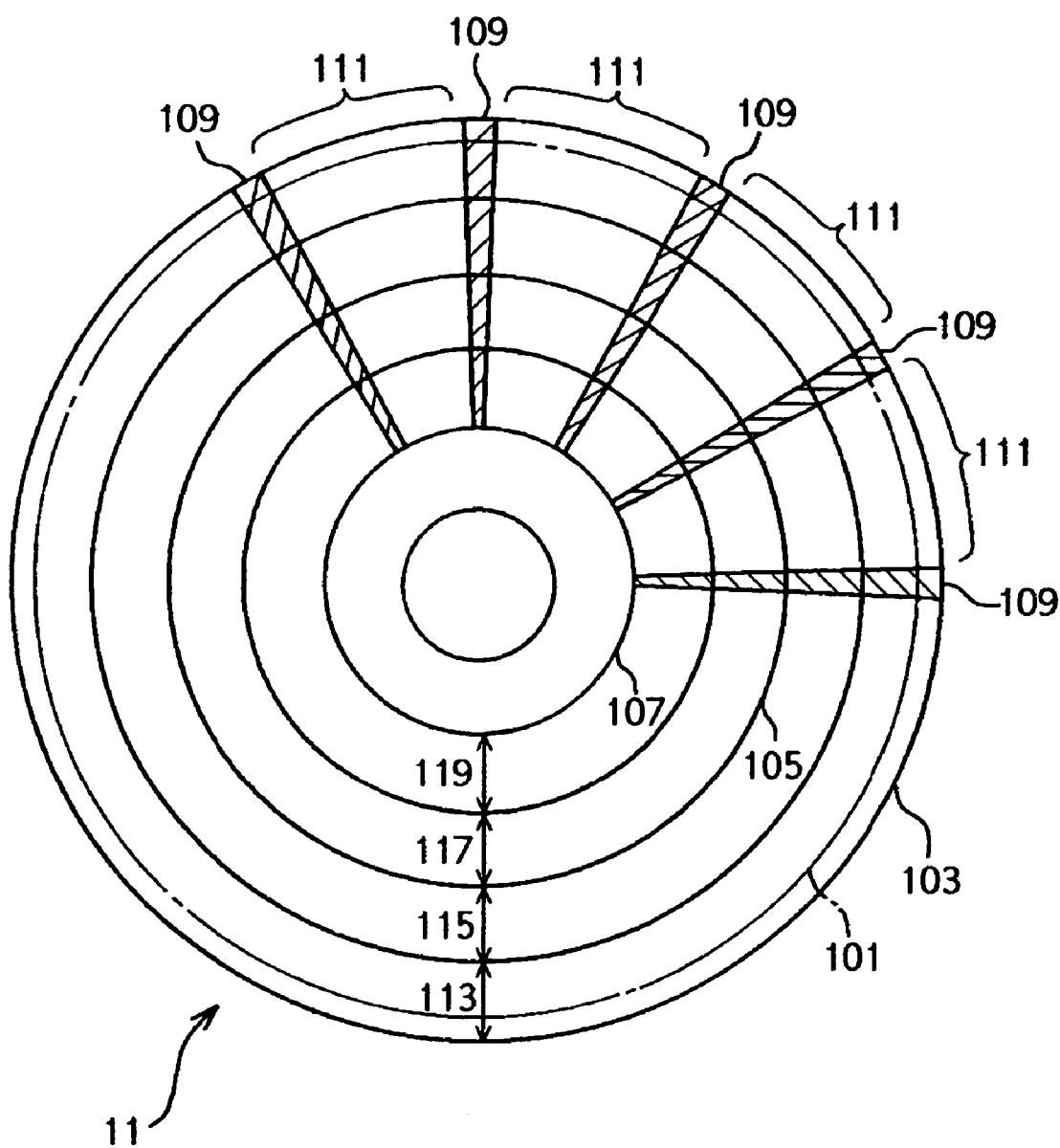
FIG. 3 is a diagram illustrating a format of a magnetic disk shown in FIG. 1.

FIG. 3 is a diagram illustrating a format of a recording surface of the magnetic disk 11. Recording surfaces 11a through 11d of the magnetic disk 11 are defined by the same format. The tracks 101 whose number is about 20000 are concentrically marked on each of the recording surfaces 11a through 11d. The tracks 101 include the outermost circumferential track provided at an outermost position 103 in a radial direction of the magnetic disk 11, the innermost circumferential track provided at an innermost position 107, and middle tracks provided at respective middle positions 105. Here, referring to FIG. 2, the four head/sliders 13a through 13d are devised to move pivotally as one united body on the recording surfaces 11a through 11d of the magnetic disk 11 respectively. When each of the head/sliders 13a through 13d is positioned at a certain specific track, a cylindrical area formed by the tracks at which the head/sliders 13a through 13d are positioned is called a cylinder.

On each of the recording surfaces 11a through 11d, there are provided a plurality of servo areas 109 that are radially sectioned at regular intervals from the innermost circumferential track side toward the outermost circumferential track side. Although FIG. 3 illustrates only some servo areas 109, the servo areas 109 are discretely provided over the whole magnetic disk 11 at equivalent angles in a circumferential direction. Servo data is written to each of the servo areas 109. Between the two servo areas 109 adjacent to each other, there is provided a data area 111 to which user data and system data are written. The servo data, the user data, and the system data are recorded along each track.

This magnetic disk drive 10 adopts a sector method in which a track is divided into areas, each of which has a fixed length, and a plurality of sectors are provided in the data area 111. However, a variable method in which a track is divided into areas, each having a variable length, may also be adopted. The sector is a unit of writing to, or reading from, the magnetic disk 11. The sector is also used for a unit of data transfer performed between the magnetic disk drive 10 and the host computer 50; its value can be selected from among values such as 256 bytes, 512 bytes, and 1024 bytes. In this embodiment, in order to calculate a mean value of characteristic values representing the magnitude of a read signal of servo data, the tracks are grouped into four zones 113, 115, 117, 119, each of which has about 5000 tracks defined in a radial direction. Regardless of what is said in this embodiment, each of the four zones is not always required to include substantially the same number of tracks. In addition, the number of zones is not limited to four.

FIGS. 4A, 4B are diagrams illustrating detailed formats of the servo area 109 and the data area 111. As shown in FIG. 4A, servo data is written to each servo area 109, and n sectors are sectioned in the data area 111. As shown in FIG. 4B, in the servo data, a preamble pattern is provided at the top, and next a servo address mark (SAM), a gray code and a burst pattern come in this order. The gray code and the burst pattern are called position information of the head.

The preamble is a continuous pattern, and is used for a phase-locked loop (PLL) to synchronize the gray code and the burst pattern with a system clock of the magnetic disk drive 10. In addition, the preamble is used to adjust a gain of the VGA for amplifying read outputs of the gray code and the burst pattern that are transmitted from the head signal amplifier 44.

The SAM is a dedicated pattern that is not used by others. As soon as the SAM is detected, a servo interrupt signal is generated, and is then transmitted to the control unit 48. As a result, the HDC enters a servo control state. In addition, as soon as the SAM is detected, a servo gate signal used for timing of reading out a gray code and a burst pattern is further generated. A time window is provided so that a judgment can be made as to whether or not the SAM can be read. If it is judged that the SAM cannot be read within a given period of time, the control unit 48 is notified of it as a servo error, and the state after that is dealt with by the ERP.

The gray code is a field in which information about a cylinder number of each cylinder or about a truck number is described by use of a gray code. Incidentally, information about a sector number of the data area 111 may also be additionally written in the gray code field. In contrast to usual binary codes, the gray code is so defined that an increase in value by one changes only one bit pattern. By use of this pattern, even if the head/slider 13 flies between a track n and a track n+1 during the seek control, either value can be obtained.

The burst pattern is used for track following that detects an accurate position of the head/slider 13 relative to a target track so as to position the head/slider 13 at the center of the target track. As shown in FIG. 4C, for example, the burst pattern is formed of four parts A, B, C, D, each of which has a width equivalent to a track pitch where one period is equivalent to two tracks. These parts are arranged in a manner that they are displaced to one another by half of a track pitch in a radial direction. The burst pattern is not limited to this example. The burst pattern can be arbitrarily configured. Read data of the burst pattern is said to be a position detection signal (hereinafter referred to as PES). Calculating the amplitude of a PES obtained from an ABCD pattern makes it possible to calculate displacement of the head/slider 13 from the center of the track.

Configuration of R/W Channel

The R/W channel 46 is used to convert a write signal to be written to the magnetic disk 11, which has been transferred from the host computer 50, into a write signal of a head. In addition, the R/W channel 46 is also used to convert a read signal, which has been read from the magnetic disk 11 through the head, into a read signal to be transferred to the control unit 48. A configuration of the R/W channel 46 will be described with reference to a block diagram shown in FIG. 5. A variable gain amplifier 201 includes a VGA. With a gain value instructed from outside, the variable gain amplifier 201 amplifies a feeble read signal of the head which is amplified by the head signal amplifier 44. In order to realize this embodiment, together with the gain detector 209 or instead of the gain detector 209, the head output detector 203 detects a read output value of the head as a characteristic value representing the magnitude of a read signal of servo data, and then transmits the read output value to the control unit 48. Accordingly, this embodiment includes a mode in which only the head output detector 203 exists; a mode in which both the head output detector 203 and the gain detector 209 exist; and a mode in which only the gain detector 209 exists. A peak value, or a mean value, of the amplitude of an analog read signal of the servo data may also be used as the read output value of the head. Further, an area which is an integration value of a waveform may also be used as the read output value. Moreover, even if the read output value is a value obtained by adding some value to the above-mentioned values, the value can be used so long as the value represents the magnitude of the read signal of the head as a result.

A read output value of the head obtained when the head/slider 13 flies in a flying high state becomes smaller than that obtained when the head/slider 13 flies at the usual height. The read output value, therefore, can be used to detect the flying high state. The head output detector 203 detects the output of the head signal amplifier 44. However, if the head output detector 203 comprises an amplifier, the head output detector 203 may directly detect a read signal of the head. The waveform shaping unit 205 shapes a waveform of a read signal amplified by the variable gain amplifier 201. An automatic gain controller 207 includes an AGC, and measures the output of the variable gain amplifier 201. If a measured value differs from its reference value, the automatic gain controller 207 changes a gain, and thereby operates so as to keep the output of the variable gain amplifier 201 constant. When the read signal is user data, the automatic gain controller 207 automatically adjusts a gain, in response to a change in signal level of the read signal, by feedback control on the basis of digital processing so that amplitude of the read signal amplified by the variable gain amplifier 201 is kept constant within a range. In addition, when the read signal is servo data, the automatic gain controller 207 determines a gain according to a preamble that is written at the top of the servo data. Then, according to the determined gain, the automatic gain controller 207 amplifies servo data following the preamble, relating to position information of the head. As a result, the R/W channel 46 can keep the processing performance of the servo data and the user data excellent even if it is influenced by magnetic properties of the recording surface of the magnetic disk 11 and fluctuations in flying height of the head/slider 13.

The gain detector 209 detects from the automatic gain controller 207 a gain value of the automatic gain controller 207 that has been set when the preamble of the servo data has been read. The gain detector 209 then converts the detected value into a digital value before transmitting the value to the control unit 48. The automatic gain controller 207 performs gain control so that the output of the variable gain amplifier 201 is kept constant. Accordingly, if the head/slider 13 flies in a flying high state, the gain gets higher than the case in which the head/slider 13 flies in a normal state. Therefore, not only the head read output value but also the gain value of the variable gain amplifier 201 that has been determined when the servo data has been read can be treated as a characteristic value representing the magnitude of the read signal of the servo data.

A data channel 211 comprises an A/D converter, a serial/parallel converter, a data modulator, a data demodulator, and an error-correction circuit. The data channel 211 converts a read signal read from a sector of the data area 111 into data, and also converts data received from the MPU into a write signal. The channel controller 217 controls operation of the data channel 211 by a read gate signal or a write gate signal which is transmitted from the control unit 48. The servo channel 213 includes a gray code demodulator, a position information demodulator, and a SAM detector. The gray code demodulator decodes a gray code, a waveform of which has been shaped by the waveform shaping unit 205, and then converts the decoded gray code into a digital signal by the AD converter. Subsequently, the gray code demodulator outputs the digital signal to the control unit 48 to notify of a position of a track read by the head. The position information demodulator reads four burst patterns ABCD, waveforms of which have been shaped by the waveform shaping unit 205, and then uses the AD converter to analog-to-digital convert peak hold values obtained in timing of PES of each pattern. After that, the position information demodulator transmits the values to the control unit 48. The control unit 48 stores the PES in a register so that the HDC can use the PES for arithmetic operation of a position of the head/slider 13.

Every time the SAM detector detects SAM from a read signal of servo data, the SAM detector transmits the SAM to the channel controller 217. The channel controller 217 controls the total operation of the R/W channel 46. In a periodical cycle within which the head/slider 13 reaches a position where the servo data is located, the channel controller 217 receives a channel timing signal from the control unit 48 to instruct the automatic gain controller 207 to start the gain control. The automatic gain controller 207 controls a gain of the variable gain amplifier 201 used to amplify a read output of the head that is reading a preamble, and thereby keeps the output constant. At the time when the SAM detector detects SAM, the channel controller 217 holds a gain value of the automatic gain controller 207, and then instructs the gain detector 209 to sample the held gain value, and to transmit the value to the control unit 48. Once the gain is determined, the gray code and the burst pattern, which are recorded in the servo area 109, are amplified with the determined gain. The timing at which a gain value of the automatic gain controller 207 is held may also be obtained by operating a counter after receiving a channel timing signal. Moreover, the channel controller 217 generates a servo gate signal in the timing of receiving SAM, and then transmits them to the gray code demodulator and the position information demodulator to make them active. Further, the channel controller 217 transmits a servo interrupt signal to the control unit 48.

Up to this point, the block diagram of the R/W channel 46 according to the embodiment of the present invention is described. The name and function of each block and its interrelationship with others, which are described with reference to the diagram, are merely examples. Therefore, they may also be divided or integrated into any kind of unit as a function or a semiconductor device within the principles of the present invention.

Method for Detecting a Flying High State to Move the Head/Slider to the Innermost Circumferential Track for Recovery What will be described below is a method whereby in the magnetic disk drive 10 configured as above, a flying high state is detected, and then the head/slider 13 is positioned at the innermost circumferential track so as to restore the flying high state to a state of a normal steady-state flying position. Although the conditions in which the flying high state occurs have already been described, it is confirmed that the flying high state can be recovered if the conditions of air current for the ABS of the slider are changed. In one experiment, it is confirmed that moving a head/slider flying in a flying high state to the innermost circumferential track results in sudden return to a normal steady-state flying position. This is because in the innermost circumferential track of the magnetic disk 11, the circumferential speed is slower than that in the outermost circumferential track, and accordingly the speed of air current produced on a surface where the head/slider is flying is also slow, with the result that buoyant force applied to the ABS is weak.

Thus, if the magnetic disk drive 10 according to this embodiment detects a flying high state by various kinds of methods, the magnetic disk drive 10 positions the head/slider 13 in the vicinity of the innermost circumferential track of the magnetic disk 11 so as to restore it to the normal state. The vicinity of the innermost circumferential track corresponds to a range within which an effect of the present invention, that is to say, getting back to a normal flying position, can be produced. To be more specific, this is an area in which there are provided the given number of tracks arranged in succession from the innermost circumferential track toward the outermost circumferential track. The range varies depending on the outside diameter and rotational speed of the magnetic disk. According to the experiments by the inventors, the following results could be confirmed: if the range was set at about 25% of all tracks successively provided from the innermost circumferential track toward the outermost circumferential track, a flying position of the head/slider was successfully recovered in all cases; if the range was set at about 30% of all tracks, the recovery succeeded in most cases although there occurred some failures; and if the range was set at about 35% of all tracks, the recovery succeeded within a practical range. A position at which the head/slider 13 is positioned can be delimited as a position at which the AHSA 15 comes into contact with the inner crash stop 29. If the control unit 48 can read servo data, the head/slider 13 may also be positioned by the seek control at a specific track that is predetermined. A track open to a user may also be used as this specific track. However, if a posture of the head/slider 13 which changes when shifting from a flying high state to a normal flying position is taken into consideration, it is desirable that the specific track be a track where writing of user data is prohibited.

If the control unit 48 cannot receive a read signal of servo data, or if the control unit 48 cannot correctly read a read signal received, it is possible to recover the flying height by controlling the AHSA 15 using the back EMF or BEMF control to position the head/slider in the vicinity of the innermost circumferential track. In this case, it is convenient if in particular the AHSA 15 is pivotally moved until the AHSA 15 comes into contact with the inner crash stop 29, and then the AHSA 15 is stopped at that location. A judgment as to whether or not the AHSA 15 comes into contact with the inner crash stop 29 and is then stopped there can be made by a counter electromotive voltage of the voice coil 25 and speed control parameters possessed by the HDC. The HDC, therefore, may also be so controlled that concurrently with the contact, an electric current to be supplied to the voice coil 25 is interrupted or a bias current for lightly pressing on the inner crash stop 29 is supplied. When the AHSA 15 is positioned in the vicinity of the innermost circumferential track, it is desirable that the AHSA 15 be stopped at the position at least for 50 through 100 msec in order to stabilize the head/slider 13 oscillating particularly in the horizontal direction. In addition, stopping the head/slider in the vicinity of the innermost circumferential track also produces an effect of restoring the flying height to a normal state if the head/slider which is kept in a flying high state moves to the vicinity of the innermost circumferential track. Furthermore, if performance of the magnetic disk drive 10 is taken into consideration, it is desirable to select a value within a range from 1 to 2 sec as the upper limit of a period of time during which the AHSA 15 is stopped.

The magnitude of a read signal of servo data that is read by the head/slider flying in a flying high state is smaller than that of a read signal of servo data which is read by the head/slider flying in a normal state. Accordingly, with the object of detecting a flying high state, the control unit 48 can use a read output value of the head as a characteristic value representing the magnitude of a read signal of servo data. The read output value of the head can be obtained from the head output detector 203 of the R/W channel 46. The magnetic disk drive 10 first measures a read output value obtained when the head/slider 13 flies at a normal height, and then stores this value in the ROM of the control unit 48 or a system data area of the magnetic disk 11 as a reference value. The ROM or the magnetic disk 11 serves a function as a storage unit for storing the reference value. The reference value may also be obtained by doing sampling from the whole area of the magnetic disk 11. The reference value may also be obtained from only one or more tracks provided in the vicinity of the outermost circumferential track. This is because a flying high state can be practically detected by comparing an actual read output value of the head with the reference value in the vicinity of the outermost circumferential track where the flying high state often occurs, which minimizes the influence on the performance.

Moreover, by using as the reference value a mean value calculated from a plurality of sampling values, it is possible to reduce the influence of variations in values detected from individual tracks. Such variations are caused by a defect of servo data written to the magnetic disk, its thermal asperity, or the like. The reference value may also be determined by selecting a plurality of sampling values, which are used to obtain a plurality of sampling values, from among all tracks of the magnetic disk 11, and then by calculating only one. In addition, for each of zones 113, 115, 117, 119 shown in FIG. 3, a plurality of tracks included in each zone is selected, and a calculation is made on a zone basis. This method may also be used.

When the head/slider 13 reads servo data of one or more tracks to be compared with the reference value, the channel controller 217 controls the head output detector 203 so that it transmits a read output value of the servo data belonging to the track to the MPU of the control unit 48. The MPU reads out into the RAM the reference value stored beforehand in the ROM, together with track information. Then, when the head/slider 13 reads servo data of a corresponding track, the MPU receives the read output value of the head from the head output detector 203 to compare the read output value with the reference value. If the number of the head's read output values transmitted from the head output detector 203 is more than one, the MPU calculates a mean value of them, and then compares the mean value with the reference value. If the reference value is provided on a zone basis, a comparison is made for each corresponding zone—for example, a head's read output value read from one or more tracks included in the zone 113 shown in FIG. 3 is compared with the reference value that is a mean value calculated for the zone 113. If a threshold value used to judge a flying high state is set at a value close to the reference value, there arises a possibility that a normal state may be judged to be a flying high state by mistake, which exerts a bad influence on the performance of the magnetic disk drive 10. In addition, if the threshold value is set at a value that is too low for the reference value, there arises a possibility that a flying high state cannot be detected. Accordingly, as an example, it is desirable that the threshold value be set at a value ranging from about 40 to 50% of the reference value which is a mean value calculated from values detected from a plurality of tracks. Moreover, although an absolute value can be used as the threshold value, the absolute value differs depending on conditions of each storage device such as a writing layer of the magnetic disk 11, and properties of each servo data reading system.

As another example, a gain value of the variable gain amplifier 201 detected by the variable gain detector 209 can be used as a characteristic value representing the magnitude of a read signal. A method for recording the reference value, a control method by the MPU and the channel controller 217, and the like, are the same as those for the head output detector 203. Therefore, their description will be omitted here. Because both the read output value and the gain value are characteristic values representing the magnitude of the read signal of the head, if a mutual conversion table is prepared so that a gain value for amplifying a read output of the head is recorded as a reference value, it becomes possible to detect a flying high state by transmitting as a read value a read output value of the head to the MPU to compare both of them. In addition, if a read output value of the head is recorded as a reference value, it is also possible to detect a flying high state by transmitting as a read value a gain value for amplifying a read output of the head to the MPU to compare both of them.

Although the reference value is usually written in a normal flying state at the production phase of the magnetic disk drive 10, the properties of the head and electronic circuits change with time. Accordingly, the reference value may also be updated at any time by detecting a read signal of servo data in a normal flying state after the magnetic disk drive 10 is actually used, and then by writing the values to the magnetic disk 11 or the ROM. In this embodiment, the reference value is stored beforehand in the nonvolatile recording medium, for instance, in the ROM, the magnetic disk 11, or the like; in other words, the reference value is treated as a static value. However, the following method may also be used as another mode: before each seek operation starts, detecting read output values of the head or gain values of the variable gain amplifier 201 from a plurality of tracks in the vicinity of the current track position; calculating a mean value of the read output values or that of the gain values, and storing the mean value in the RAM as a dynamic reference value; and comparing this mean value with a mean value of read output values of the head or a mean value of gain values of the variable gain amplifier 201 which are calculated from a plurality of tracks in the vicinity of a target track of the seek operation.

Method whereby if a Write Error is Detected as a Result of Executing Write Verification Immediately After Loading the Head/Slider is Moved to the Vicinity of the Innermost Circumferential Track with the Object of Recovery As another example of a method for detecting a flying high state, there is a method whereby if a write error is detected as a result of executing write verification immediately after loading from the ramp 21, it is judged to be a flying high state. As described above, because a flying posture of the head/slider 13 immediately after it is loaded from the ramp 21 is unstable, it is effective to execute write verification. However, in this embodiment, if a write error is detected as a result of the write verification immediately after the loading, it is judged that a flying high state occurs, and therefore the head/slider 13 is moved to the vicinity of the innermost circumferential track to try the recovery. A write error will occur not only by a flying high state but also by other causes. However, these other causes do not substantially decrease the performance of a magnetic disk drive that usually does write verification immediately after loading, and accordingly it is possible to realize this embodiment relatively simply. Therefore, on the assumption that a write error is caused by a flying high state, the restoration to a normal flying position is tried as part of ERP, which is an effective approach.

Figure 7:
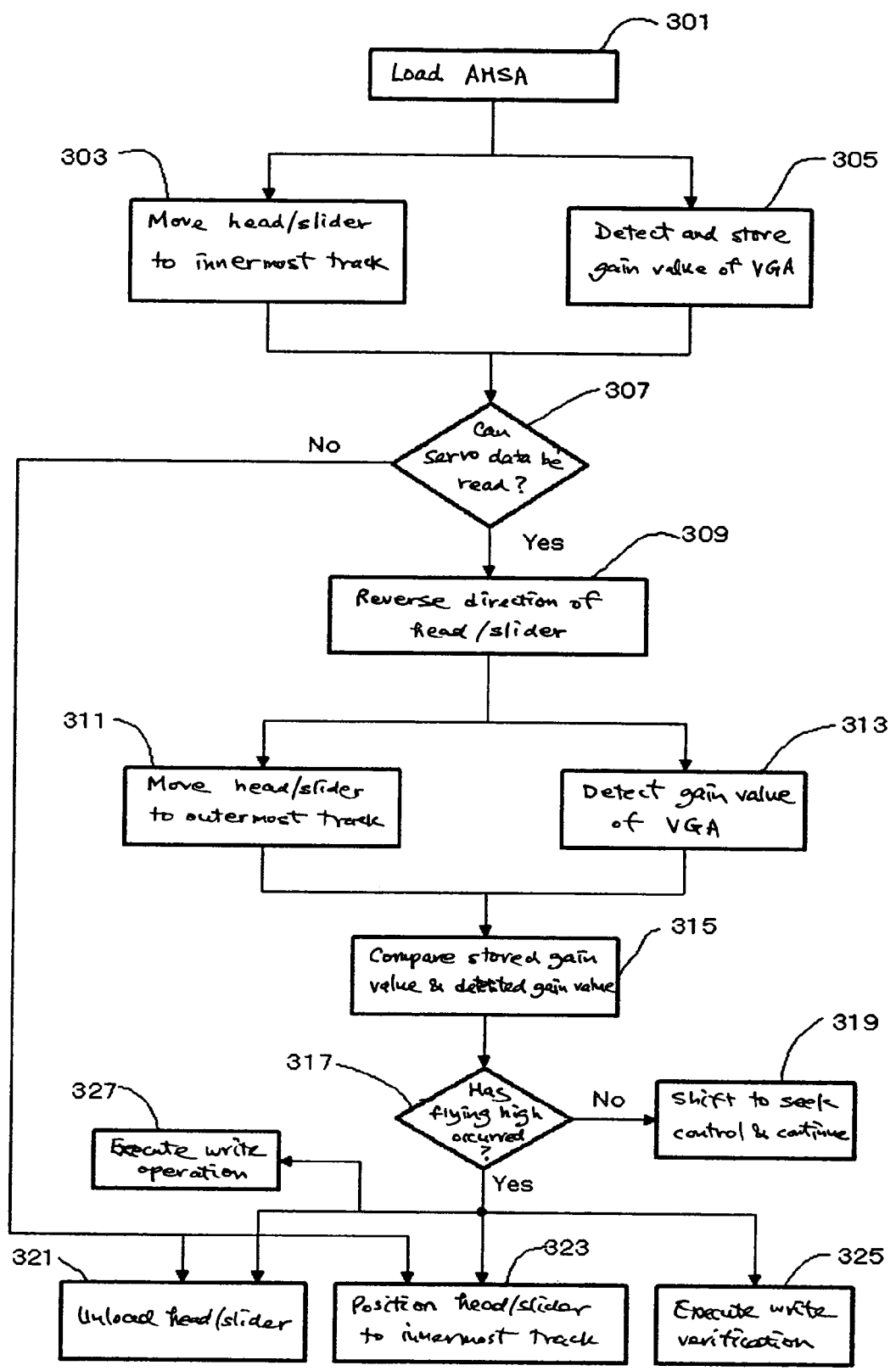
FIG. 7 is a flowchart illustrating a method for detecting an abnormal condition of a flying height by the BEMF control immediately after loading, and then for executing write verification, according to an embodiment of the invention.

Method whereby an Abnormal Condition of a Flying Height is Detected by the Back EMF Control Immediately After Loading, and then Operation to Cope with this is Executed What will be described next with reference to FIG. 7 is a method whereby a flying high state is detected by the back EMF or BEMF control immediately after loading of the head/slider 13 from the ramp 21, and then operation to cope with the flying high state is executed.

Block 301

In the magnetic disk drive 10, while read or write operation is being terminated, or while the power supply is turned off, the head/slider 13 is being retracted into the ramp 21. In a block 301, in the HDC of the control unit 48, the back EMF control is adopted as a control mode for the VCM 28. As soon as the host computer 50 transmits a read command or a write command to the MPU of the control unit 48, the MPU gives an instruction to the HDC. Then, the HDC transmits initial manipulated variables relating to pivotal movement of the AHSA 15 that is predetermined for the VCM driver 40, and thereby drives the VCM 28 to pivotally move the head/slider 13 in the direction of the innermost circumferential track of the magnetic disk 11 so that the AHSA 15 is loaded.

Block 303

In a block 303, the head/slider 13 moves away from the ramp 21, and flies on a surface of the magnetic disk 11 by the buoyant force generated from an air current of the magnetic disk 11. The counter electromotive voltage detector 42 measures the counter electromotive voltage generated in the voice coil 25 of the AHSA 15 that starts moving pivotally, and then transmits the measured voltage to the HDC. The HDC estimates moving speed of the head/slider 13 from the counter electromotive voltage of the voice coil 25 transmitted from the counter electromotive voltage detector 42, and calculates an error relative to target speed to determine a new manipulated variable of the VCM 28 which can follow the target speed. The HDC then transmits the new manipulated variable to the VCM driver 40. In this embodiment, the target speed is set at 50 mm/sec. The VCM driver 40 generates an electric current to be applied to the voice coil 25 in a manner that the electric current corresponds to the transmitted manipulated variable, and thereby the VCM driver 40 drives the VCM 28. The head/slider 13 moves toward the innermost circumferential track along an outgoing path by means of the back EMF control.

In a state in which the head/slider 13 is retracted into the ramp 21, servo data cannot be read from the magnetic disk 11, which makes it impossible to perform the seek control. In addition, the flying height of the head/slider is not stable immediately after it is loaded from the ramp. Therefore, controlling the movement of the head/slider 13 immediately after the loading by the back EMF control instead of the seek control is conveniently advantageous in view of the fact that runaway caused by a failure of reading servo data can be prevented. Moving speed by the seek control is, for example, 350 mm/sec., which is too fast to detect an abnormal condition of the flying height. In addition, if an abnormal condition of the flying height is detected under the same measurement conditions between the outgoing path and a return path, higher accuracy can be achieved. Therefore, in this embodiment, the outgoing path in the block 303 and the return path in a block 311 adopt the back EMF control. However, the points of the present invention do not exclude the detection by means of the seek control in the block 305 or the block 313. The seek control may also be performed for the AHSA 15 within a range in which servo data can be read.

Block 305

In the block 305, while the head/slider 13 moves along the outgoing path, the MPU receives a gain value from the gain detector 209 at intervals of the predetermined sampling period, and stores the gain value in the RAM. The HDC transmits a channel timing signal together with a status signal of the back EMF control to the channel controller 217 of the R/W channel 46, and thereby makes active the variable gain amplifier 201, the automatic gain controller 207, the gain detector 209, and the SAM detector. If the head output detector 203 is provided for the purpose of using a read output value of the head, the head output detector 203 is also made active. A method for detecting a flying high state by use of the read output value of the head, instead of the gain value, or together with the gain value, is the same as that described above.

The channel controller 217 controls the gain detector 209 so as to detect a gain value from the automatic gain controller 207 at intervals of a given sampling period, and then transmit the gain value to the MPU of the control unit 48. The MPU stores the transmitted gain value in the RAM. If the head output detector 203 is provided, the channel controller 217 controls the head output detector 203 in a similar manner so as to transmit a read output value of the head to the control unit 48 at intervals of a given sampling period. In this embodiment, the sampling period is so determined that 200 gain values are detected for each of the zones 113, 115, 117, 119 shown in FIG. 3. The MPU, therefore, calculates a mean value of the gain values on a zone basis, and stores the mean values in the RAM.

Block 307

While the head/slider 13 is moving along the outgoing path under the back EMF control, the SAM detector transmits a SAM detection signal to the channel controller 217 every time the SAM detector detects a SAM. The channel controller 217 monitors whether or not a SAM could be detected in a given time window. In a block 307, if the SAM detector could not detect the given number of SAMs, the channel controller 217 notifies the HDC of a servo error. If the servo error is notified, it is not necessary to transmit a read signal of servo data to the control unit 48. In this case, there is a possibility that a flying high state has occurred. Accordingly, as soon as the HDC stops the operation being performed in the block 305 such as detection and storing in the RAM, the head/slider 13 is positioned in the vicinity of the innermost circumferential track by means of the back EMF control (block 323), or the head/slider 13 is unloaded into the ramp 21 (block 321), so that the recovery can be tried. After positioning the head/slider 13 in the vicinity of the innermost circumferential track, the SAM detector detects a SAM, and consequently the HDC can read position information of the head. After that, the process may also proceed to the block 309 or the block 321. The flying high state extremely rarely occurs as a result of various kinds of conditions being combined at the time of loading. Accordingly, the flying high state can often be recovered by unloading the head/slider 13 and loading it again.

Upon receipt of the SAM detection signal, the channel controller 217 generates a servo gate signal to make active the gray code demodulator and position information demodulator of the servo channel. The gray code demodulator and the position information demodulator transmit position information about a current position of the head to the HDC. The channel controller 217 that has received the SAM detection signal transmits a servo interrupt signal to the HDC of the control unit 48. Even if receiving the servo interrupt signal, the HDC does not perform the seek control during the back EMF control. The HDC monitors a current position of the magnetic head by use of track information transmitted from the gray code demodulator and a PES peak hold value transmitted from the position information demodulator. If the HDC judges that the position information of the head transmitted from the servo channel cannot be read, the HDC positions the head/slider 13 in the vicinity of the innermost circumferential track by means of the back EMF control (block 323), or unloads the head/slider 13 into the ramp 21 (block 321). Moreover, if the channel controller 217 cannot receive the SAM detection signal, and consequently cannot transmit position information of the head to the HDC from the servo channel, the HDC also positions the head/slider 13 in the vicinity of the innermost circumferential track by means of the back EMF control (block 323), or unloads the head/slider 13 into the ramp 21 (block 321).

Block 309

In the block 309, the HDC reverses a moving direction of the head/slider from the outgoing path to the return path in the vicinity of the innermost circumferential track. In this embodiment, regardless of position information about a track or a cylinder which is included in a command transmitted from the host computer 50, a first target position at the time of loading, set in the HDC which performs the back EMF control, is defined as a position at which the AHSA 15 comes into contact with the inner crash stop 29. While controlling the moving speed of the head/slider 13 by means of the counter electromotive voltage of the voice coil 25, the HDC moves the head/slider 13 along the outgoing path from the outermost circumferential track toward the vicinity of the innermost circumferential track until the AHSA 15 comes into contact with the inner crash stop 29, and thereby the HDC detects the timing of reversing to the return path. When the AHSA 15 comes into contact with the inner crash stop 29 and the operation stops there, the supply of the counter electromotive voltage from the voice coil 25 stops. As a result, the difference between the target speed and the actual speed is not decreased over time. The HDC can know a reversing position by detecting this state. If firmware of the HDC includes such a program that delays the target speed in advance in the vicinity of the inner crash stop 29, it is possible to soften the shock to the inner crash stop 29 of the AHSA 15. In the timing of reversing from the outgoing path to the return path, the head/slider 13 may also be stopped for about 50 msec to 2 sec—optimally for about 100 msec to 1 sec. It is because a posture of the head/slider oscillating when it reverses can be stabilized.

Moreover, predetermining a time period spent from the start of the movement along the outgoing path to its end, and the target speed of the head/slider 13 by means of the back EMF control, permits the HDC to detect a reversing position as elapsed time after the head/slider 13 starts moving along the outgoing path. In this case, the AHSA 15 may sometimes reverse without coming into contact with the inner crash stop 29. Furthermore, the following method for detecting the timing of reversing may also be used: as described in the block 307, while the head/slider 13 is moving along the outgoing path, transmitting track position information from the servo channel 213 to the HDC; and monitoring by the HDC a position of the head/slider 13 to detect that the head/slider 13 reaches a predetermined track in the vicinity of the innermost circumferential track, and thereby to detect the reversing timing.

Incidentally, the vicinity of the innermost circumferential track is an area delimited by a range of about 35% of the total tracks provided from the innermost circumferential track toward the outermost circumferential track. This is preferably an area delimited by a range of about 30% of the total tracks, and is optimally an area delimited by a range of 25% of the total tracks. Upon detecting the reversing timing, the HDC transmits a manipulated variable to the VCM driver 40 so that a moving direction of the head/slider 13 reverses, and consequently the head/slider 13 moves from the vicinity of the innermost circumferential track toward the vicinity of the outermost circumferential track.

Block 311

In the block 311, as is the case with the outgoing path described in the block 303, while controlling the speed of the head/slider 13 by the counter electromotive voltage of the voice coil 25, the HDC moves the head/slider 13 along the return path to the vicinity of the outermost circumferential track. The vicinity of the outermost circumferential track is a track area that is located at least outside the central track. This preferably corresponds to an area provided closer to the outermost circumferential track as compared with a track located in the middle position between the central track and the outermost circumferential track. An ending position of the return path can be determined by elapsed time after leaving the reversing position, detection of a predetermined track position, the AHSA 15's coming into contact with the outer crash stop 31 after it is unloaded into the ramp 21, or the like. However, in this embodiment, the ending position is determined by the elapsed time after leaving the reversing position at which the outgoing path reverses to the return path. Incidentally, it may also be so devised that also in the return path, as is the case with the block 307, the HDC judges whether or not servo data can be read, and if the servo data cannot be read, then the process proceeds to the block 321 or the block 323.

Block 313

In the block 313, as is the case with the outgoing path described in the block 305, the channel controller 217 transmits to the MPU a gain value detected by the gain detector 209 at intervals of the same sampling period. The MPU then calculates a mean value of the gain on a zone basis from the transmitted gain values, and stores the value in the RAM. From the viewpoint of measurements to be made under the same conditions between the outgoing path and the return path, it is desirable to equalize the sampling period of the return path with that of the outgoing path. However, the scope of the present invention also covers a case in which the number of samplings for measuring a mean value differs between them.

Blocks 315, 317

On completion of the operation for the return path in the block 311 and the block 313, the MPU compares on a zone basis the gain value of the return path with the corresponding gain value of the outgoing path that has been stored in the RAM as the mean value on a zone basis. The MPU thereby calculates the difference between the mean values. In this embodiment, if the difference between the mean values of the gain values is 30 or more in any of the compared zones, the MPU judges that flying positions of the head/slider 13 differ between the outgoing path and the return path and therefore a flying high state has occurred during the loading. Here, the above-mentioned judgment that a flying high state has occurred during the loading is based on the following assumption. That is, the flying high state has a nature that it is liable to occur immediately after the head/slider 13 is loaded from the ramp 21, and that when the head/slider 13 moves to the vicinity of the innermost circumferential track, the flying high state is restored to a normal state. In other words, by measuring gain values generated by the back EMF control for both the outgoing path and the return path, it is possible to detect that a flying high state has occurred in the outgoing path, and it has returned to a normal state in the return path.

If the difference of the gain values between the outgoing path and the return path does not exceed 30, the following two cases can be assumed: a flying high state has not occurred both during the loading and in the return path; and a flying high state occurred during the loading has not returned to a normal state in the return path. In general, a flying position of the head/slider 13 is high on a side of the outermost circumferential track, and this flying position becomes low on a side of the innermost circumferential track. Because this characteristic is thought to similarly work also in the flying high state, there is also a possibility of the latter case. However, judging from the knowledge of the inventors, its possibility is low. In this embodiment, therefore, in the latter case, it is not judged that a flying high state has occurred.

In this embodiment, the difference of the gain values between the outgoing path and the return path is judged not only by calculating the absolute value but also by including the sign in the value. It is therefore possible to know when the flying high state occurs, during the load or during the movement along the return path. For example, if the difference between the gain value of the outgoing path and that of the return path is +30 or more, it is probable that although a flying high state has occurred during the load, the flying high state has returned to a normal state at present. Nevertheless, the MPU performs reliable write operation by executing write verification in a block 325 to ensure the writing. In addition, if the difference between the gain value of the outgoing path and that of the return path is −30 or less, it is probable that although a flying high state has not occurred during the load, it has occurred in the return path, and that the head/slider is still in a flying high state. The MPU, therefore, can execute the following operation to cope with the flying high state: unloading the head/slider in the block 321; positioning the head/slider in the vicinity of the innermost circumferential track in the block 323; or the like. Moreover, the MPU may also execute the steps from the block 301 again. The block 321, the block 323, and the block 325 correspond to the above-mentioned operation used to cope with the abnormal condition of the flying height.

If the characteristic value representing the magnitude of a read signal of servo data is a read output value of the head, the sign of the read output value used for judgment is opposite to that of the gain value. Accordingly, in like manner, it is possible to tell when the flying high state occurs, during the loading or during the movement along the return path. This makes it possible to execute the operation to cope with the flying high state in the block 321, the block 323, or the block 325.

The threshold value, which is 30, can be properly selected in response to the degree to which the gain values change by a factor other than the flying high state. The threshold value differs depending on the number of samples used to calculate a mean value, the place where the gain values are measured, and the like. The threshold value is not always set as the absolute value as in this embodiment. The threshold value may also be set as a ratio, for example, by calculating a ratio of the change in gain value of the return path to the change in gain value of the outgoing path. If a comparison is made between the mean values that have been calculated from the gain values sampled from the zones 113, 115, 117, 119 in both the outgoing path and the return path, it is not always necessary to compare the mean values between the same zones. The comparison may also be made between an outgoing path zone and a return path zone which do no correspond to each other; for example, the mean value calculated from the zone 113 in the outgoing path shown in FIG. 3 is compared with the mean value calculated from the zone 15 in the return path. It is because the difference between a normal flying position and a flying position at the time of flying high is relatively large. Accordingly, even if a comparison is made between different zones, the difference between the gain values is large, which makes it possible to detect a flying high state. Moreover, a comparison may also be made between a mean value of gain values detected from all zones in the outgoing path and a mean value of gain values detected from all zones in the return path. In this case, the threshold value becomes smaller than 30.

In addition, without averaging a plurality of sampling values, a comparison may also be made between two gain values, each of which is obtained from one track. If a comparison is made between two gain values each being obtained from one track, the two gain values do not always need to be obtained from tracks that completely correspond to each other so long as an outgoing path track and a return path track which are in proximity to each other can be compared. If a comparison is made between two gain values each being obtained from one track, it is desirable to compare two gain values obtained from tracks located between the central track and the outermost circumferential track. It is because a flying high state is liable to occur in the outermost circumferential track. In the block 317 shown in FIG. 7, if the MPU judges that a flying high state has occurred, the operation sequence continues as follows: if loading is done according to a write command, the process proceeds to the block 325; and if the loading is done according to a read command, the process proceeds to a block 327. In the block 317, if it is judged that no flying high state has occurred, the process in FIG. 7 proceeds to a block 319.

Block 319

The HDC is so devised that on receipt of an instruction from the MPU, the HDC can select either the back EMF control or the servo control. In the block 319, upon being notified by the MPU that no flying high state has occurred, the HDC switches back the control mode from the back EMF control to the seek control, and also changes a status to the seek control. Accordingly, when a servo interrupt signal and head position information are transmitted from the servo channel 213 thereafter, the HDC executes the seek control and the track-following control.

Block 325

In the block 325, since the flying high state has occurred due to the reciprocating motion by the back EMF control after loading from the ramp 21, the MPU executes write verification for the next first write command. If it is checked in the block 317 that a flying high state has occurred, the assumption can be made that the head/slider 13 is currently flying in a normal flying height. Nevertheless, it is probable that an unstable element still remains in the behavior of the head/slider 13. For this reason, the MPU executes the write verification so as to check that the head/slider 13 is in a normal flying state, and so as to ensure reliable write operation.

In the magnetic disk drive 10, wrong data will not be eventually read at the time of its read operation, but at the time of the write operation, unless the write verification is executed, it is not possible to judge whether or not data transmitted from the host computer 50 has been correctly written. There is a method in which all written data is write verified. However, the write verification needs additional processes including writing to a specific sector, reading of data from a written sector, and comparison between written data and read data, which cause the operation speed of the magnetic disk drive 10 to decrease. Therefore, it is not desirable to execute write verification more than necessary. Accordingly, as described in this embodiment, it is effective to execute write verification on the write operation of the head/slider 13 that can read servo data now but has been flying in a flying high state at the last movement. The write verification may also be done for all write commands executed before the head/slider 13 is unloaded into the ramp 21 again. In addition, as another method, the write verification is executed for only the first write command; and if it is checked that the writing is successfully completed, the write verification is stopped.

Moreover, if an error is detected from the write data as a result of the write verification, the magnetic disk drive 10 can restore the flying height by positioning the head/slider 13 in the vicinity of the innermost circumferential track before writing data again. After that, the magnetic disk drive 10 executes the write command again, and if an error is detected from the write data as a result of the write verification, the magnetic disk drive 10 may temporarily unload the head/slider into ramp 21 and load it again. The magnetic disk drive 10 executes the write command after the reloading, and if an error is detected as a result of the write verification, the magnetic disk drive 10 may write data to an alternate sector since there is a possibility that the sector of the magnetic disk 11 contains a defect. The flying high state by the back EMF shown in FIG. 7 is detected by comparing gain values of the variable gain amplifier 201 between the outgoing path and the return path, by comparing read output values of the head from the head output detector 203 between the outgoing path and the return path, or by comparing a gain value with a read output value. As an alternative, the flying high state can also be detected by measuring a gain value and a read output value only in the outgoing path under the back EMF control.

As described above, a flying high state is liable to occur in the head/slider 13 flying above tracks on the side of the outermost circumferential track of the magnetic disk 11. The flying high state tends to restore a normal state by flying on the side of tracks of the innermost circumferential track. Accordingly, a flying high state can be detected by detecting, in the outgoing path, a characteristic value representing the magnitude of a read signal of servo data that has been read from a track outside the central track, and a characteristic value representing the magnitude of a read signal of servo data that has been read from a track inside the central track, and then by comparing the characteristic values.

Block 327

In the case of a read command, the process proceeds to the block 327 even if a flying high state has occurred. The magnetic disk drive 10 executes read operation. If the magnetic disk drive 10 cannot read data correctly due to the occurrence of a flying high state, the magnetic disk drive 10 reads the data again. If the data cannot be read again, the magnetic disk drive 10 executes ERP such as the block 321 and the block 323 so as to perform given operation to cope with the flying high state; and as occasion requires, the magnetic disk drive 10 finally handles it as a hardware error.

Up to this point, the present invention is described on the basis of the specific embodiments shown in the drawings. The present invention, however, is not limited to the embodiments illustrated in the drawings. It is needless to say that so long as the effects of the present invention are produced, any configuration which is known in the past can also be adopted.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A rotating disk storage device comprising:
   a rotating disk recording medium on which a plurality of tracks are arranged, servo data being written to each of the plurality of tracks;
   a head/slider flying on a surface of the rotating disk recording medium at least at a first steady-state flying position or at a second steady-state flying position, said head/slider including a head and a slider to which said head is attached;
   a turnable actuator head suspension assembly being mounted with said head/slider; and a control unit which performs adaptable operation on the basis of a result of comparison between a first characteristic value representing the magnitude of a read signal of the servo data which is read at the first steady-state flying position by the head and a second characteristic value representing the magnitude of a read signal of the servo data which is read at the second steady-state flying position by the head.

2. A rotating disk storage device according to claim 1, wherein said first characteristic value and said second characteristic value are each a read output value of the head.

3. A rotating disk storage device according to claim 1, wherein the first characteristic value and the second characteristic value are each a gain value of a variable gain amplifier for amplifying a read output of the head.

4. A rotating disk storage device according to claim 1, wherein said adaptable operation is operation of controlling the actuator head suspension assembly to position the head/slider in the vicinity of the innermost circumferential track among the plurality of tracks.

5. A rotating disk storage device according to claim 4, wherein the vicinity of the innermost circumferential track is delimited by a range of about 35% of the total tracks provided from the innermost circumferential track toward the outermost circumferential track.

6. A rotating disk storage device according to claim 1, wherein said adaptable operation is operation of executing write verification for write operation at least once.

7. A rotating disk storage device according to claim 1, further comprising:
a ramp that provides the head/slider with a retraction area;
wherein said adaptable operation is operation of controlling the actuator head suspension assembly to unload the head/slider into the ramp.

8. A rotating disk storage device according to claim 1, wherein the first characteristic value is stored in a nonvolatile recording medium of the rotating disk storage device.

9. A rotating disk storage device comprising:
a rotating disk recording medium on which a plurality of tracks are arranged, the plurality of tracks including an innermost circumferential track, a central track and an outermost circumferential track, servo data being written to each of the plurality of tracks;
a head/slider flying above a surface of the rotating disk recording medium at a plurality of steady-state flying positions, said head/slider including a head and a slider to which said head is attached;
a turnable actuator head suspension assembly being mounted with said head/slider;
a detector configured to detect a characteristic value representing the magnitude of a read signal of the servo data read by the head; and
a control unit which, while controlling the actuator head suspension assembly, receives the characteristic value as a first characteristic value, said characteristic value being detected by the detector in an outgoing path along which the head/slider moves from the vicinity of the outermost circumferential track to the vicinity of the innermost circumferential track; while controlling the actuator head suspension assembly, receives the characteristic value as a second characteristic value, said characteristic value being detected by the detector in a return path along which the head/slider moves from the vicinity of the innermost circumferential track to the vicinity of the outermost circumferential track; and performs adaptable operation on the basis of the result of comparison between the first characteristic value and the second characteristic value.

10. A rotating disk storage device according to claim 9, wherein said characteristic values are each a read output value of the head.

11. A rotating disk storage device according to claim 9, wherein said characteristic values are each a gain value of a variable gain amplifier for amplifying a read output of the head.

12. A rotating disk storage device according to claim 9, wherein the first characteristic value and the second characteristic value are detected from one or more tracks placed between the central track and the outermost circumferential track.

13. A rotating disk storage device according to claim 9, wherein at least while a read signal of the servo data cannot be received, or while the read signal received cannot be read, said control unit moves the head/slider by back EMF control.

14. A rotating disk storage device according to claim 9, wherein said adaptive operation is operation of executing write verification for write operation at least once.

15. A method for moving a head/slider from a second steady-state flying position to a first steady-state flying position in a rotating disk storage device which includes
a rotating disk recording medium provided with a plurality of tracks to which servo data is written;
the head/slider flying above a surface of the rotating disk recording medium at least at the first steady-state flying position or at the second steady-state flying position, said head/slider including a head and a slider to which said head is attached; and
an actuator head suspension assembly mounted with said head/slider,
said method comprising:
on a basis of a characteristic value representing the magnitude of a read signal of the servo data, detecting a state in which the head/slider is flying at the second steady-state flying position; and
if said state in which the head/slider is flying at the second steady-state flying position is detected, positioning the head/slider in the vicinity of the innermost circumferential track among the plurality of tracks by controlling the actuator head suspension assembly.

16. A detection method for detecting a change in steady-state flying position in a rotating disk storage device, said rotating disk storage device including:
a rotating disk recording medium on which a plurality of tracks are arranged, the plurality of tracks including an innermost circumferential track and an outermost circumferential track, servo data being written to each of the plurality of tracks;
a head/slider flying above a surface of the rotating disk recording medium at a plurality of steady-state flying positions, said head/slider including a head and a slider to which said head is attached; and
an actuator head suspension assembly mounted with said head/slider;
said detection method comprising:
moving the head/slider along an outgoing path from the vicinity of the outermost circumferential track to the vicinity of the innermost circumferential track by controlling the actuator head suspension assembly;
while moving the head/slider along the outgoing path, detecting a first characteristic value representing the magnitude of a read signal of the servo data read by the head;

moving the head/slider along a return path from the vicinity of the innermost circumferential track to the vicinity of the outermost circumferential track by controlling the actuator head suspension assembly;

while moving the head/slider along the return path, detecting a second characteristic value representing the magnitude of a read signal of the servo data read by the head; and comparing the first characteristic value with the second characteristic value.

17. A method for preventing a write error from occurring in a rotating disk storage which includes a rotating disk recording medium in which a plurality of tracks are arranged, servo data being written to each of the plurality of tracks, the plurality of tracks including an innermost circumferential track and an outermost circumferential track;

a head/slider flying above a surface of the rotating disk recording medium at a plurality of steady-state flying positions, said head/slider including a head and a slider to which said head is attached;

an actuator head suspension assembly mounted with said head/slider; and a ramp that provides the head/slider with a retraction area; said detection method comprising:

loading the head/slider on the rotating disk recording medium from the ramp;

moving the head/slider along an outgoing path from the vicinity of the outermost circumferential track to the vicinity of the innermost circumferential track by performing back EMF control on the actuator head suspension assembly;

while moving the head/slider along the outgoing path, detecting a first characteristic value representing the magnitude of a read signal of the servo data read by the head;

moving the head/slider along a return path from the vicinity of the innermost circumferential track to the vicinity of the outermost circumferential track by performing the back EMF control on the actuator head suspension assembly;

while moving the head/slider along the return path, detecting a second characteristic value representing the magnitude of a read signal of the servo data read by the head;

comparing the first characteristic value with the second characteristic value; and on the basis of the result of the comparison step, executing write verification for write operation at least once.

18. A rotating disk storage device comprising:

a rotating disk recording medium in which a plurality of tracks are arranged, servo data being written to said plurality of tracks, said plurality of tracks including an innermost circumferential track and an outermost circumferential track;

a head/slider flying on a surface of the rotating disk recording medium at a plurality of steady-state flying positions, said head/slider including a head and a slider to which said head is attached;

a turnable actuator head suspension assembly, said actuator head suspension assembly being provided with said head/slider; and a control unit which performs adaptable operation on the basis of a result of comparison between a first characteristic value representing the magnitude of a read signal of the servo data read by the head at any one of the plurality of steady-state flying positions on one or more tracks and a second characteristic value representing the magnitude of a read signal of the servo data read by the head at the steady-state flying position, which differs from said any one of the steady-state flying position, on one or more tracks that differ from said one or more tracks.

19. A rotating disk storage device comprising:

a rotating disk recording medium in which a plurality of tracks are arranged, servo data being written to each of said plurality of tracks, said plurality of tracks including an innermost circumferential track;

a head/slider flying above a surface of the rotating disk recording medium at a first steady-state flying position or at a second steady-state flying position, said head/slider including a head and a slider to which said head is attached;

a turnable actuator head suspension assembly mounted with said head/slider;

a servo channel configured to detect a read signal of the servo data read by the head; and a control unit that moves the head/slider to the vicinity of the innermost circumferential track if the read signal cannot be received from the servo channel, or if the read signal received cannot be read.

20. A rotating disk storage device comprising:

a rotating disk recording medium in which a plurality of tracks are arranged, servo data is written to each of said plurality of tracks, said plurality of tracks including an innermost circumferential track;

a head/slider flying above a surface of the rotating disk recording medium at a first steady-state flying position or at a second steady-state flying position, said head/slider including a head and a slider to which said head is attached;

an actuator head suspension assembly mounted with said head/slider;

a ramp that provides the head/slider with a retraction area; and a control unit which executes write verification for first write operation after loading the head/slider on the rotating disk recording medium from the ramp, and controls the actuator head suspension assembly to position the head/slider in the vicinity of the innermost circumferential track if a write error is detected.

* * * * *